(12) United States Patent
Sakai et al.

(10) Patent No.: US 8,993,918 B2
(45) Date of Patent: Mar. 31, 2015

(54) SPOT-WELDING METHOD AND SPOT-WELDING DEVICE

(75) Inventors: Kensuke Sakai, Tokyo (JP); Keigo Kimura, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 529 days.

(21) Appl. No.: 13/137,600

(22) Filed: Aug. 29, 2011

(65) Prior Publication Data
US 2012/0055910 A1    Mar. 8, 2012

(30) Foreign Application Priority Data
Sep. 8, 2010  (JP) ................................. 2010-200643

(51) Int. Cl.
| | | |
|---|---|---|
| *B23K 11/11* | (2006.01) | |
| *B23K 11/31* | (2006.01) | |
| *B23K 11/36* | (2006.01) | |
| *B23K 37/04* | (2006.01) | |

(52) U.S. Cl.
CPC ............ *B23K 11/115* (2013.01); *B23K 11/314* (2013.01); *B23K 11/36* (2013.01); *B23K 37/0435* (2013.01); *B23K 2201/185* (2013.01)
USPC .................. 219/86.22; 219/86.23; 219/86.25; 219/161

(58) Field of Classification Search
USPC ............ 219/86.1, 86.22, 86.23, 86.25, 86.33, 219/86.41, 86.51, 86.61, 121.82, 137.31, 219/138, 161; 901/42; 228/44.3, 44.5, 44.7; 248/154, 229.2, 229.25; 408/240
See application file for complete search history.

(56) References Cited

U.S. PATENT DOCUMENTS

| | | | | |
|---|---|---|---|---|
| 1,259,271 A | * | 3/1918 | Murray ........................ | 219/91.2 |
| 3,427,424 A | * | 2/1969 | Kirchberger et al. ....... | 219/86.41 |
| 4,130,750 A | * | 12/1978 | Bennett et al. ............. | 219/78.15 |
| 4,480,170 A | * | 10/1984 | Kondou et al. ............. | 219/125.1 |
| 5,866,868 A | | 2/1999 | Hirane | |
| 5,895,584 A | * | 4/1999 | Sakota ........................ | 219/86.24 |

(Continued)

FOREIGN PATENT DOCUMENTS

| | | | | |
|---|---|---|---|---|
| JP | 2003-251468 | * | 9/2003 | ............. B23K 11/20 |
| JP | 2003-251468 A | | 9/2003 | |
| JP | 2003-251469 A | | 9/2003 | |

OTHER PUBLICATIONS

United States Office Action dated Apr. 29, 2014, in U.S. Appl. No. 13/423,023.

*Primary Examiner* — Dana Ross
*Assistant Examiner* — James Sims, III
(74) *Attorney, Agent, or Firm* — McGinn IP Law Group, PLLC

(57) ABSTRACT

When spot-welding a workpiece including a thin plate, a first thick plate, and a second thick plate, the workpiece is clamped by a fixed electrode in contact with the second thick plate, a movable electrode in contact with the thin plate, and control-pressure applying unit set adjacent to the movable electrode and in contact with the thin plate. Pressure is applied to the second thick plate by the fixed electrode, and pressure and control pressure are respectively applied by the movable electrode and the control-pressure applying unit to the thin plate. The pressure from the fixed electrode is controlled to be smaller than the pressure from the movable electrode. The current density between the thin plate and the first thick plate increases.

4 Claims, 17 Drawing Sheets

(56) References Cited

U.S. PATENT DOCUMENTS

| | | |
|---|---|---|
| 6,294,753 B1 | 9/2001 | Fujii et al. |
| 7,588,223 B2 * | 9/2009 | Wolvin .................... 248/229.15 |
| 7,891,618 B2 * | 2/2011 | Carnevali ................... 248/228.6 |
| 8,334,474 B1 * | 12/2012 | Oatridge et al. ............. 219/86.9 |
| 2005/0029233 A1 | 2/2005 | Schuhen |
| 2011/0180516 A1 | 7/2011 | Takahashi et al. |
| 2012/0126780 A1 | 5/2012 | Watanabe et al. |
| 2013/0037525 A1 | 2/2013 | Tanaka |

* cited by examiner

FL = FU + Fα
FU < FL

FL = FU

FL=FU+Fα
FU<FL

SPOT-WELDING METHOD AND SPOT-WELDING DEVICE

CROSS REFERENCES TO RELATED APPLICATIONS

The present application claims priority from Japanese Patent Application No. 2010-200643 filed on Sep. 8, 2010, the entire contents of which are hereby incorporated by reference.

BACKGROUND OF THE INVENTION

1. Field of the Invention

The present invention relates to spot-welding methods and spot-welding devices for spot-welding a workpiece having a stacked-plate structure constituted of stacked plate materials having different thicknesses.

2. Description of the Related Art

Generally, when joining together stacked plate materials, such as steel plates, a spot-welding technique is widely used. Specifically, this spot-welding technique involves using a pair of welding electrodes to clamp and apply pressure to the stacked plates, applying high current between the welding electrodes for a predetermined time, and then increasing the temperature at a joint section to substantially a melting temperature so as to form a nugget.

In spot-welding, the diameter of the nugget gradually increases with increasing current when the pressure applied by the two welding electrodes and the electricity application time are fixed. However, the calorific value becomes excessive when the current value is too high, causing expulsion and surface flash, in which molten metal spatters, to occur between the plate materials. Specifically, such expulsion and surface flash is an explosion phenomenon of the molten metal caused by overheating of the joint section and causes holes and cracks to form in the nugget. This results in discontinuity in the shape of the nugget and the metallographic structure, causing a reduced thickness of the joint section as well as a significant reduction in the strength thereof. In contrast, if the current is too low, sufficient joint strength cannot be obtained since the nugget becomes small in size. If the applied pressure is low, the contact area between the plate materials correspondingly decreases, leading to the occurrence of expulsion and surface flash caused by overheating due to an increased current density. On the other hand, an excessively applied pressure leads to an increase in the contact area at the joint section, resulting in a reduced current density and a reduced calorific value. As a result, the nugget is reduced in size and the weld strength is lowered.

Referring to FIG. 18A, when spot-welding a workpiece 100 constituted of three stacked plates, which are a thin plate 101 having low rigidity, and a first thick plate 102 and a second thick plate 103 that are thicker and more rigid than the thin plate 101, a movable electrode 121 and a fixed electrode 122 are used to clamp the workpiece 100 therebetween in a state where the thin plate 101 and the first thick plate 102 as well as the first thick plate 102 and the second thick plate 103 are tightly attached to each other with no gap therebetween. Then, when a power source 123 applies electricity to the workpiece 100 via the movable electrode 121 and the fixed electrode 122, clamping the workpiece 100 therebetween, the current density in an electric path between the movable electrode 121 and the fixed electrode 122 becomes substantially uniform so that a good nugget extending from the thin plate 101 to the second thick plate 103 is formed, thereby achieving required weld strength.

In actuality, however, when the workpiece 100 is clamped and pressed between the movable electrode 121 and the fixed electrode 122, the thin plate 101 having low rigidity and the first thick plate 102 bend upward, causing gaps to form between the thin plate 101 and the first thick plate 102 as well as between the first thick plate 102 and the second thick plate 103. In this case, the contact area between the movable electrode 121 and the thin plate 101 is increased due to the bending of the thin plate 101, whereas the contact area of the joint section between the thin plate 101 and the first thick plate 102 as well as the contact area of the joint section between the first thick plate 102 and the second thick plate 103 are decreased due to the gaps.

Therefore, the current density at a joint section of the fixed electrode 122 at the side of the second thick plate 103 becomes higher than that at a joint section of the movable electrode 121 at the side of the thin plate 101. This results in a larger local calorific value between the first thick plate 102 and the second thick plate 103 than between the thin plate 101 and the first thick plate 102.

As a result, a nugget 105 is first formed at the joint section between the first thick plate 102 and the second thick plate 103, as shown in FIG. 18A. Then, the nugget 105 gradually increases in size so that the thin plate 101 and the first thick plate 102 are ultimately welded to each other, as shown in FIG. 18B. However, because the amount of weld penetration between the thin plate 101 and the first thick plate 102 is small, the weld strength is unstable. Thus, the thin plate 101 may become delaminated, and the weld quality may vary from place to place. This problem is prominent especially with increasing thickness of the first thick plate 102 and the second thick plate 103 since this makes it difficult for the nugget 105 to reach the joint section between the first thick plate 102 and the thin plate 101.

Another factor that makes the weld strength unstable due to a small amount of weld penetration between the thin plate 101 and the first thick plate 102 is a small thickness of the thin plate 101. Specifically, such a thin plate 101 with a small thickness surrenders its heat to the movable electrode 121 by being in contact therewith and therefore does not increase in temperature, making it difficult to form the nugget 105.

Japanese Unexamined Patent Application Publication No. 2003-251468 discloses an example of a spot-welding method as a countermeasure against this problem. Specifically, as shown in FIG. 19, when spot-welding the workpiece 100 constituted of stacked plates, i.e., the thin plate 101, the first thick plate 102, and the second thick plate 103, the tip diameter of the movable electrode 121 that comes into contact with the thin plate 101 is made smaller than the tip diameter of the fixed electrode 122 that comes into contact with the second thick plate 103 so that the contact area between the thin plate 101 and the movable electrode 121 is smaller than the contact area between the second thick plate 103 and the fixed electrode 122. Thus, the current density in the electric path between the movable electrode 121 and the fixed electrode 122 gradually decreases from the movable electrode 121 towards the fixed electrode 122. As a result, the calorific value between the thin plate 101 and the first thick plate 102 becomes larger so that a good nugget is formed, whereby the weld strength between the thin plate 101 and the first thick plate 102 is increased.

Japanese Unexamined Patent Application Publication No. 2003-251469 discloses another spot-welding method. Specifically, as shown in FIG. 20, when spot-welding the workpiece 100 constituted of three stacked plates, i.e., the thin plate 101, the first thick plate 102, and the second thick plate 103, a pressure FU from a movable electrode 135 located at the thin plate 101 side is set to be smaller than a pressure FL from a fixed electrode 134 located at the second thick plate 103 side so that the contact resistance between the thin plate 101 and the first thick plate 102 increases, whereas the contact resistance between the first thick plate 102 and the second thick plate 103 decreases. Thus, when electricity is applied between the movable electrode 135 and the fixed electrode 134, the calorific value at the joint section between the thin plate 101 and the first thick plate 102 is increased, thereby increasing the weld strength between the thin plate 101 and the first thick plate 102.

FIG. 21 illustrates the configuration of a spot-welding device used for implementing this method. Specifically, a spot-welding device 130 is attached to a wrist portion 126 of a welding robot 125. The welding robot 125 spot-welds the workpiece 100 by moving the spot-welding device 130 to each spot-welding position of the workpiece 100 supported by a clamper 128.

The spot-welding device 130 includes a base 132 that is supported in a vertically movable manner by a linear guide 131 fixed to a support bracket 127 attached to the wrist portion 126. The base 132 is provided with a C-shaped yoke 133 that extends downward therefrom. A lower end of the C-shaped yoke 133 is provided with the fixed electrode 134.

A pressure actuator 136, such as a servomotor, is attached to an upper-end of the base 132. The movable electrode 135 is attached to a lower end of a rod 137 that is moved in the vertical direction by the pressure actuator 136, such that the movable electrode 135 faces the fixed electrode 134. A servomotor 138 is attached to an upper end of the support bracket 127. By actuating the servomotor 138, the base 132 is moved in the vertical direction via a ball-screw mechanism.

Based on teaching data preliminarily stored in a controller (not shown), the pressure FU from the movable electrode 135 located at the thin plate 101 side is set to be smaller than the pressure FL from the fixed electrode 134 (FU<FL).

In order to set the pressure FU from the movable electrode 135 to be smaller than the pressure FL from the fixed electrode 134 (FU<FL) in this manner, the controller first uses the servomotor 138 to move the base 132 upward so as to bring the fixed electrode 134 into contact with the lower surface of the workpiece 100, and also uses the pressure actuator 136 to move the movable electrode 135 downward so as to bring the movable electrode 135 into contact with the upper surface of the workpiece 100. In this case, the pressure of the pressure actuator 136 is uniformly applied to the movable electrode 135 and the fixed electrode 134 via the base 132 and the C-shaped yoke 133.

Subsequently, the base 132 is lifted upward by the servomotor 138. This upward lifting of the base 132 causes the pressure FL from the fixed electrode 134 to increase by an amount equivalent to how much the base 132 is lifted upward, whereby the pressure FU from the movable electrode 135 becomes smaller than the pressure FL from the fixed electrode 134 (FU<FL).

As a result, when electricity is applied between the movable electrode 135 and the fixed electrode 134, the current density at the joint section between the thin plate 101 and the first thick plate 102 increases, causing the calorific value to become relatively higher than the calorific value at the joint section between the first thick plate 102 and the second thick plate 103. Consequently, a good nugget extending from the thin plate 101 to the second thick plate 103 without an uneven amount of weld penetration is formed, thereby ensuring the weld strength.

In Japanese Unexamined Patent Application Publication No. 2003-251468 described above, the tip diameter of the movable electrode 121 that comes into contact with the thin plate 101 is made smaller than the tip diameter of the fixed electrode 122 that comes into contact with the second thick plate 103 so that the current density in the electric path between the movable electrode 121 and the fixed electrode 122 gradually decreases from the movable electrode 121 towards the fixed electrode 122, thereby increasing the weld strength between the thin plate 101 and the first thick plate 102.

However, the current density in the electric path between the movable electrode 121 and the fixed electrode 122 varies depending on the pressures from the movable electrode 121 and the fixed electrode 122, the thicknesses of the thin plate 101, the first thick plate 102, and the second thick plate 103, and the shape or the area of the workpiece 100. This makes it difficult to ensure uniform weld quality. Furthermore, using various movable electrodes 121 and fixed electrodes 122 having different tip diameters in an interchangeable manner in accordance with the thicknesses of the thin plate 101, the first thick plate 102, and the second thick plate 103 and the shape or the area of the workpiece 100 is not practical since it is extremely troublesome and can possibly lead to a significant decrease in productivity. In addition, the preparation and management of such various movable electrodes 121 and fixed electrodes 122 having different tip diameters require a large amount of management cost.

In Japanese Unexamined Patent Application Publication No. 2003-251469, on the other hand, the spot-welding device 130 is moved to each spot-welding position of the workpiece 100 supported by the clamper 128 so as to bring the fixed electrode 134 into contact with the second thick plate 103 of the workpiece 100 and to bring the movable electrode 135 into contact with the thin plate 101. Moreover, the pressure FU from the movable electrode 135 is set to be smaller than the pressure FL from the fixed electrode 134 by lifting the base 132 upward so that the current density between the thin plate 101 and the first thick plate 102 becomes relatively higher. Thus, a sufficient calorific value can be ensured at the joint section between the thin plate 101 and the first thick plate 102, thereby achieving an increased amount of weld penetration and increased weld strength.

However, in order to set the pressure FU from the movable electrode 135 to be smaller than the pressure FL from the fixed electrode 134 by moving the base 132 in a state where the workpiece 100 clamped by the clamper 128 is held and pressed between the fixed electrode 134 and the movable electrode 135, a large load is required on the clamper 128 that clamps the workpiece 100. On the other hand, when the clamped position of the workpiece 100 by the clamper 128 and the welding position, i.e., the spot-welding position, of the workpiece 100 are distant from each other, the workpiece 100 becomes bent. This causes the pressure FL from the fixed electrode 134 and the pressure FU from the movable electrode 135 to become unbalanced, making it difficult to ensure stable contact resistance between the thin plate 101 and the first thick plate 102 and stable contact resistance between the first thick plate 102 and the second thick plate 103. This can possibly result in variations in the current density at the joint sections of the workpiece 100, leading to reduced spot-welding quality. Furthermore, this method is limited to specific spot-welding devices since the method cannot be used in a spot-welding device that has an equalizing function between the base and the wrist portion of the robot for allowing for movement in response to a reaction force generated during the welding and pressing process.

SUMMARY OF THE INVENTION

Accordingly, in view of the circumstances described above, a first object of the present invention is to provide a spot-welding method and a spot-welding device that can achieve uniform and stable weld quality when a workpiece having a three-stacked-plate structure formed by stacking a thin plate over one of two stacked thick plates is spot-welded.

A second object of the present invention is to provide a spot-welding method and a spot-welding device that can achieve uniform and stable weld quality when a workpiece having a four-stacked-plate structure formed by stacking two thin plates respectively over opposite faces of two stacked thick plates is spot-welded.

A spot-welding method according to a first aspect of the present invention for achieving the first object is for spot-welding a workpiece including a thin plate, a first thick plate, and a second thick plate that are sequentially stacked, the first thick plate and the second thick plate being thicker than the thin plate. The spot-welding method includes clamping and pressing the workpiece by using a first welding electrode that is brought into contact with the second thick plate, a second welding electrode that faces the first welding electrode and is brought into contact with the thin plate, and control-pressure applying unit that is set adjacent to the second welding electrode and is brought into contact with the thin plate; and spot-welding the workpiece by applying electricity between the second welding electrode and the first welding electrode in the state where the workpiece is clamped and pressed.

Accordingly, when spot-welding the workpiece having a three-stacked-plate structure including the thin plate, the first thick plate, and the second thick plate, the workpiece is clamped and pressed by using the first welding electrode that is brought into contact with the second thick plate, the second welding electrode that faces the first welding electrode and is brought into contact with the thin plate, and the control-pressure applying unit that is set adjacent to the second welding electrode and is brought into contact with the thin plate. Thus, the pressure from the first welding electrode is applied to the second thick plate of the workpiece, whereas the pressure from the second welding electrode and the control pressure from the control-pressure applying unit set adjacent to the second welding electrode are applied to the thin plate, whereby the pressure from the second welding electrode located at the thin plate side is set to be smaller than the pressure from the first welding electrode located at the second thick plate side. Consequently, when electricity is applied between the second welding electrode and the first welding electrode, the current density at the joint section between the thin plate and the first thick plate relatively increases. As a result, a good nugget extending from the thin plate to the second thick plate without an uneven amount of weld penetration is formed, whereby the weld quality for the workpiece is enhanced.

In the spot-welding method according to the first aspect of the present invention, $FL=FU+F\alpha$ may be satisfied in the state where the workpiece is clamped and pressed, where FL denotes a pressure applied to the second thick plate by the first welding electrode, FU denotes a pressure applied to the thin plate by the second welding electrode, and $F\alpha$ denotes a control pressure applied to the thin plate by the control-pressure applying unit.

Accordingly, in the state where the workpiece is clamped and pressed, the pressure FL applied to the second thick plate by the first welding electrode is equal to the sum of the pressure FU applied by the second welding electrode and the control pressure $F\alpha$ applied by the control-pressure applying unit to the thin plate ($FL=FU+F\alpha$). Thus, the workpiece is stably clamped and held by the first welding electrode, the second welding electrode, and the control-pressure applying unit, and the pressure FU applied to the thin plate by the second welding electrode is equal to a difference between the pressure FL applied to the second thick plate from the first welding electrode and the control pressure $F\alpha$ from the control-pressure applying unit. Consequently, the pressure applied to the thin plate by the second welding electrode can be set to be smaller than the pressure applied to the second thick plate by the first welding electrode.

A spot-welding method according to a second aspect of the present invention for achieving the second object is for spot-welding a workpiece including a first thin plate, a first thick plate, a second thick plate, and a second thin plate that are sequentially stacked, the first thick plate and the second thick plate being thicker than the first thin plate and the second thin plate. The spot-welding method includes a first welding step for clamping and pressing the workpiece by using a first welding electrode that is brought into contact with the second thin plate, a first control presser that is set adjacent to the first welding electrode and is brought into contact with the second thin plate, and a second welding electrode that faces the first welding electrode and is brought into contact with the first thin plate, and spot-welding the workpiece by applying electricity between the second welding electrode and the first welding electrode in the state where the workpiece is clamped and pressed; and a second welding step for moving the first control presser away from the second thin plate while maintaining the workpiece in a clamped state between the first welding electrode and the second welding electrode, setting a second control presser adjacent to the second welding electrode and bringing the second control presser into contact with the first thin plate, and spot-welding the workpiece by applying electricity between the second welding electrode and the first welding electrode in a state where the workpiece is clamped and pressed by the first welding electrode, the second welding electrode, and the second control presser.

Accordingly, in the first welding step, the workpiece is clamped and pressed by the first welding electrode and the first control presser that are located at the second thin plate side, and by the second welding electrode that is located at the first thin plate side, so that the pressure applied to the second thin plate by the first welding electrode is set to be smaller than the pressure applied to the first thin plate by the second welding electrode. Thus, when electricity is applied between the second welding electrode and the first welding electrode, the current density at the joint section between the second thin plate and the second thick plate becomes relatively higher than the current density at the joint section between the first thick plate and the first thin plate, whereby the amount of weld penetration between the second thin plate and the second thick plate increases. In the second welding step, on the other hand, the workpiece is clamped and pressed by the second welding electrode and the second control presser that are located at the first thin plate side, and by the first welding electrode that is located at the second thin plate side, so that the pressure applied to the first thin plate by the second welding electrode is set to be smaller than the pressure applied to the second thin plate by the first welding electrode. Thus, when electricity is applied between the second welding electrode and the first welding electrode, the current density at the joint section between the first thin plate and the first thick plate becomes relatively higher than the current density at the joint section between the second thick plate and the second thin plate, whereby the amount of weld penetration between the first thin plate and the first thick plate increases. Consequently, a good nugget extending from the first thin plate to the second thin plate without an uneven amount of weld penetration is formed, whereby the weld quality for the workpiece is enhanced.

In the spot-welding method according to the second aspect of the present invention, FU=FL+Fα may be satisfied in the state where the workpiece is clamped and pressed in the first welding step, where FL denotes a pressure applied to the second thin plate by the first welding electrode, Fα denotes a control pressure applied to the second thin plate by the first control presser, and FU denotes a pressure applied to the first thin plate by the second welding electrode. Moreover, FL=FU+Fβ may be satisfied in the state where the workpiece is clamped and pressed in the second welding step, where FL denotes the pressure applied to the second thin plate by the first welding electrode, FU denotes the pressure applied to the first thin plate by the second welding electrode, and Fβ denotes a second control pressure applied to the first thin plate by the second control presser.

Accordingly, in the state where the workpiece is clamped and pressed in the first welding step, the sum of the pressure FL applied by the first welding electrode and the control pressure Fα applied by the first control presser to the second thin plate is equal to the pressure FU applied to the first thin plate by the second welding electrode (FU=FL+Fα). Thus, the workpiece is stably clamped by the first welding electrode, the first control presser, and the second welding electrode, and the pressure applied to the second thin plate by the first welding electrode can be set to be smaller than the pressure applied to the first thin plate by the second welding electrode. Furthermore, in the state where the workpiece is clamped and pressed in the second welding step, the sum of the pressure FU applied by the second welding electrode and the second control pressure Fβ applied by the second control presser to the first thin plate is equal to the pressure FL applied to the second thin plate by the first welding electrode (FL=FU+Fβ). Thus, the workpiece is stably clamped by the first welding electrode, the second welding electrode, and the second control presser, and the pressure applied to the first thin plate by the second welding electrode can be set to be smaller than the pressure applied to the second thin plate by the first welding electrode.

A spot-welding device according to a third aspect of the present invention for achieving the first object is configured to spot-weld a workpiece including a thin plate, a first thick plate, and a second thick plate that are sequentially stacked, the first thick plate and the second thick plate being thicker than the thin plate. The spot-welding device includes a first welding electrode that faces the second thick plate; a second welding electrode that is coaxially aligned with the first welding electrode and that faces the thin plate of the workpiece so as to clamp and press the workpiece together with the first welding electrode; and control-pressure applying unit that is set adjacent to the second welding electrode and applies a control pressure to the thin plate. The workpiece is clamped and pressed by the first welding electrode that is brought into contact with the second thick plate, the second welding electrode that faces the first welding electrode and is brought into contact with the thin plate, and the control-pressure applying unit, and the workpiece is spot-welded by applying electricity between the second welding electrode and the first welding electrode in the state where the workpiece is clamped and pressed.

Accordingly, the workpiece is clamped and pressed by the first welding electrode that is brought into contact with the second thick plate, the second welding electrode that faces the first welding electrode and is brought into contact with the thin plate, and the control-pressure applying unit that is set adjacent to the second welding electrode and is brought into contact with the thin plate. Thus, the pressure from the first welding electrode is applied to the second thick plate of the workpiece, whereas the pressure from the second welding electrode and the control pressure from the control-pressure applying unit are applied to the thin plate, whereby the pressure from the second welding electrode located at the thin plate side is set to be smaller than the pressure from the first welding electrode located at the second thick plate side. Consequently, when electricity is applied between the second welding electrode and the first welding electrode, the current density at the joint section between the thin plate and the first thick plate increases. As a result, a good nugget extending from the thin plate to the second thick plate without an uneven amount of weld penetration is formed, whereby the weld quality for the workpiece is enhanced.

A spot-welding device according to the third aspect of the present invention for achieving the first object is configured to spot-weld a workpiece including a thin plate, a first thick plate, and a second thick plate that are sequentially stacked, the first thick plate and the second thick plate being thicker than the thin plate. The spot-welding device includes a base; a first welding electrode that is supported by the base and is contactable with the second thick plate; a pressure actuator that is attached to the base and supports a second welding electrode via a rod, the pressure actuator being capable of moving the second welding electrode between a retreated position located away from the workpiece and a pressing position where the second welding electrode is brought into contact with the thin plate so as to clamp the workpiece together with the first welding electrode and to apply pressure onto the workpiece; and control-pressure applying unit that is set adjacent to the second welding electrode on the workpiece and applies a control pressure to the thin plate. The workpiece is clamped and pressed by the first welding electrode that is brought into contact with the second thick plate, the second welding electrode that faces the first welding electrode and is brought into contact with the thin plate, and the control-pressure applying unit, and the workpiece is spot-welded by applying electricity between the second welding electrode and the first welding electrode in the state where the workpiece is clamped and pressed.

Accordingly, the workpiece is clamped and pressed by using the first welding electrode that is brought into contact with the second thick plate, the control-pressure applying unit that is set adjacent to the second welding electrode and is brought into contact with the thin plate, and the second welding electrode that faces the first welding electrode and is brought into contact with the thin plate. Thus, the pressure from the pressure actuator is applied to the thin plate from the second welding electrode and is also applied to the second thick plate from the first welding electrode via the base. Moreover, the control pressure from the control-pressure applying unit is applied to the thin plate. Therefore, the pressure from the second welding electrode located at the thin plate side is set to be smaller than the pressure from the first welding electrode located at the second thick plate side.

Consequently, when electricity is applied between the second welding electrode and the first welding electrode, the current density between the thin plate and the first thick plate relatively increases. As a result, a good nugget extending from the thin plate to the second thick plate without an uneven amount of weld penetration is formed, whereby the weld quality for the workpiece is enhanced.

The control-pressure applying unit may include a control presser and a control-pressure actuator that is attached to the base and supports the control presser. The control-pressure actuator may be capable of moving the control presser between a retreated position located away from the workpiece and a pressing position where the control presser is set adjacent to the second welding electrode and brought into contact with the thin plate so as to apply the control pressure thereto. Furthermore, the control-pressure actuator may be an air cylinder attached to the base. Furthermore, the control-pressure applying unit may be a coil spring having a base end and a tip end. In this case, the coil spring may be attached to the rod by fitting the base end around the rod, and the tip end may protrude from a tip end of the second welding electrode when the coil spring is in an unloaded state.

A spot-welding device according to a fourth aspect of the present invention for achieving the second object is configured to spot-weld a workpiece including a first thin plate, a first thick plate, a second thick plate, and a second thin plate that are sequentially stacked, the first thick plate and the second thick plate being thicker than the first thin plate and the second thin plate. The spot-welding device includes a first welding electrode that faces the second thick plate; a second welding electrode that is coaxially aligned with the first welding electrode and that faces the first thin plate of the workpiece so as to clamp and press the workpiece together with the first welding electrode; and a first control presser that is set adjacent to the first welding electrode and applies a first control pressure to the second thin plate, and a second control presser that is set adjacent to the second welding electrode and applies a second control pressure to the first thin plate. The workpiece is clamped and pressed by the first welding electrode and the first control presser that are brought into contact with the second thin plate, and by the second welding electrode that faces the first welding electrode and is brought into contact with the first thin plate, and the workpiece is spot-welded by applying electricity between the second welding electrode and the first welding electrode in the state where the workpiece is clamped and pressed. The workpiece is clamped and pressed by the first welding electrode that is brought into contact with the second thin plate, and by the second welding electrode and the second control presser that face the first welding electrode and are brought into contact with the first thin plate, and the workpiece is spot-welded by applying electricity between the second welding electrode and the first welding electrode in the state where the workpiece is clamped and pressed.

Accordingly, in the first welding step, the workpiece is clamped and pressed by the first welding electrode and the first control presser that are located at the second thin plate side, and by the second welding electrode that is located at the first thin plate side, so that the pressure applied to the second thin plate by the first welding electrode is set to be smaller than the pressure applied to the first thin plate by the second welding electrode. Thus, when electricity is applied between the second welding electrode and the first welding electrode, the current density at the contact section between the second thin plate and the second thick plate becomes relatively higher than the current density at the contact section between the first thick plate and the first thin plate, thereby allowing for an increased amount of weld penetration and ensuring the weld strength between the second thin plate and the second thick plate. In the second welding step, the workpiece is clamped and pressed by the second welding electrode and the second control presser that are located at the first thin plate side, and by the first welding electrode that is located at the second thin plate side, so that the pressure applied to the first thin plate by the second welding electrode is set to be smaller than the pressure applied to the second thin plate by the first welding electrode. Thus, when electricity is applied between the second welding electrode and the first welding electrode, the current density at the contact section between the first thin plate and the first thick plate becomes relatively higher than the current density at the contact section between the second thick plate and the second thin plate, thereby allowing for an increased amount of weld penetration and ensuring the weld strength between the first thin plate and the first thick plate. Consequently, a good nugget extending from the first thin plate to the second thin plate without unevenness is formed, whereby the weld quality for the workpiece is enhanced.

A spot-welding device according to the fourth aspect of the present invention for achieving the second object is configured to spot-weld a workpiece including a first thin plate, a first thick plate, a second thick plate, and a second thin plate that are sequentially stacked, the first thick plate and the second thick plate being thicker than the first thin plate and the second thin plate. The spot-welding device includes a base; a first welding electrode that is supported by the base and is contactable with the second thick plate; a pressure actuator that is attached to the base and supports a second welding electrode via a rod, the pressure actuator being capable of moving the second welding electrode between a retreated position located away from the workpiece and a pressing position where the second welding electrode is brought into contact with the first thin plate so as to clamp the workpiece together with the first welding electrode and to apply pressure onto the workpiece; and control-pressure applying unit including a first control presser that is set adjacent to the first welding electrode on the workpiece and applies a first control pressure to the second thin plate, and a second control presser that is set adjacent to the second welding electrode on the workpiece and applies a second control pressure to the first thin plate. The workpiece is clamped and pressed by the first welding electrode and the first control presser that are brought into contact with the second thin plate, and by the second welding electrode that faces the first welding electrode and is brought into contact with the first thin plate, and the workpiece is spot-welded by applying electricity between the second welding electrode and the first welding electrode in the state where the workpiece is clamped and pressed. The workpiece is clamped and pressed by the first welding electrode that is brought into contact with the second thin plate, and by the second welding electrode and the second control presser that face the first welding electrode and are brought into contact with the first thin plate, and the workpiece is spot-welded by applying electricity between the second welding electrode and the first welding electrode in the state where the workpiece is clamped and pressed.

Accordingly, the workpiece is clamped and pressed by the first welding electrode that is brought into contact with the second thin plate, the first control presser that is set adjacent to the first welding electrode and is brought into contact with the second thin plate, and the second welding electrode that faces the first welding electrode and is brought into contact with the first thin plate. Thus, the pressure from the pressure actuator is applied to the first thin plate from the second welding electrode and is also applied to the second thin plate from the first welding electrode via the base. Moreover, the first control pressure from the first control presser is applied to the second thin plate. Therefore, the pressure from the first welding electrode located at the second thin plate side is set to be smaller than the pressure from the second welding electrode located at the first thin plate side.

Consequently, when electricity is applied between the second welding electrode and the first welding electrode, the current density between the second thin plate and the second thick plate increases, whereby a good nugget extending from the second thin plate to the second thick plate without an uneven amount of weld penetration is formed. Furthermore, the workpiece is clamped and pressed by the second welding electrode that is brought into contact with the first thin plate, the second control presser that is set adjacent to the second welding electrode and is brought into contact with the first thin plate, and the first welding electrode that faces the second welding electrode and is brought into contact with the second thin plate. Thus, due to the second control pressure applied to the first thin plate by the second control presser, the pressure applied to the first thin plate by the second welding electrode is set to be smaller than the pressure applied to the second thin plate by the first welding electrode. Therefore, when electricity is applied between the second welding electrode and the first welding electrode, the current density between the first thin plate and the first thick plate increases. As a result, a good nugget extending from the first thin plate to the first thick plate without an uneven amount of weld penetration is formed, whereby the weld quality for the workpiece is enhanced.

The control-pressure applying unit may include the first control presser, the second control presser, and a control-pressure actuator that is attached to the base and supports the first control presser and the second control presser. The control-pressure actuator may be capable of moving the first control presser and the second control presser selectively between a first pressing position and a second pressing position. The first pressing position is where the second control presser is located away from the first thin plate and where the first control presser is set adjacent to the first welding electrode and is brought into contact with the second thin plate so as to apply the first control pressure to the second thin plate. The second pressing position is where the first control presser is located away from the second thin plate and where the second control presser is set adjacent to the second welding electrode and is brought into contact with the first thin plate so as to apply the second control pressure to the first thin plate.

According to the present invention, when spot-welding the workpiece having a three-stacked-plate structure including the thin plate, the first thick plate, and the second thick plate, the workpiece is clamped and pressed by using the first welding electrode that is brought into contact with the second thick plate, the second welding electrode that faces the first welding electrode and is brought into contact with the thin plate, and the control-pressure applying unit that is set adjacent to the second welding electrode and is brought into contact with the thin plate. Thus, the pressure from the first welding electrode is applied to the second thick plate of the workpiece, whereas the pressure from the second welding electrode and the control pressure from the control-pressure applying unit set adjacent to the second welding electrode are applied to the thin plate, whereby the pressure from the second welding electrode located at the thin plate side is set to be smaller than the pressure from the first welding electrode located at the second thick plate side. Consequently, when electricity is applied between the second welding electrode and the first welding electrode, the current density between the thin plate and the first thick plate relatively increases. As a result, a good nugget extending from the thin plate to the second thick plate without an uneven amount of weld penetration is formed, whereby the weld quality for the workpiece is enhanced.

Furthermore, according to the present invention, when spot-welding the workpiece having a four-stacked-plate structure including the first thin plate, the first thick plate, the second thick plate, and the second thin plate, the first thick plate and the second thick plate being thicker than the first thin plate and the second thin plate, the workpiece is clamped and pressed by the first welding electrode and the first control presser that are located at the second thin plate side, and by the second welding electrode located at the first thin plate side.

Therefore, in the clamped section between the first welding electrode and the second welding electrode, the contact pressure between the second thin plate and the second thick plate is smaller than the contact pressure between the first thick plate and the first thin plate. When electricity is applied between the second welding electrode and the first welding electrode, the current density at the joint section between the second thin plate and the second thick plate becomes relatively higher than the current density at the joint section between the first thick plate and the first thin plate, thereby ensuring the weld strength of the second thin plate and the second thick plate. Moreover, the workpiece is clamped and pressed by the second welding electrode and the second control presser that are located at the first thin plate side, and by the first welding electrode located at the second thin plate side. Therefore, in the clamped section between the second welding electrode and the first welding electrode, the contact pressure between the first thin plate and the first thick plate is smaller than the contact pressure between the second thick plate and the second thin plate. When electricity is applied between the second welding electrode and the first welding electrode, the current density at the contact section between the first thin plate and the first thick plate becomes relatively higher than the current density at the contact section between the second thick plate and the second thin plate, thereby ensuring the weld strength of the first thin plate and the first thick plate. Consequently, a good nugget extending from the first thin plate to the second thin plate without unevenness is, formed, whereby the weld quality for the workpiece is enhanced.

DESCRIPTION OF THE PREFERRED EMBODIMENTS

First Embodiment

Figure 1:
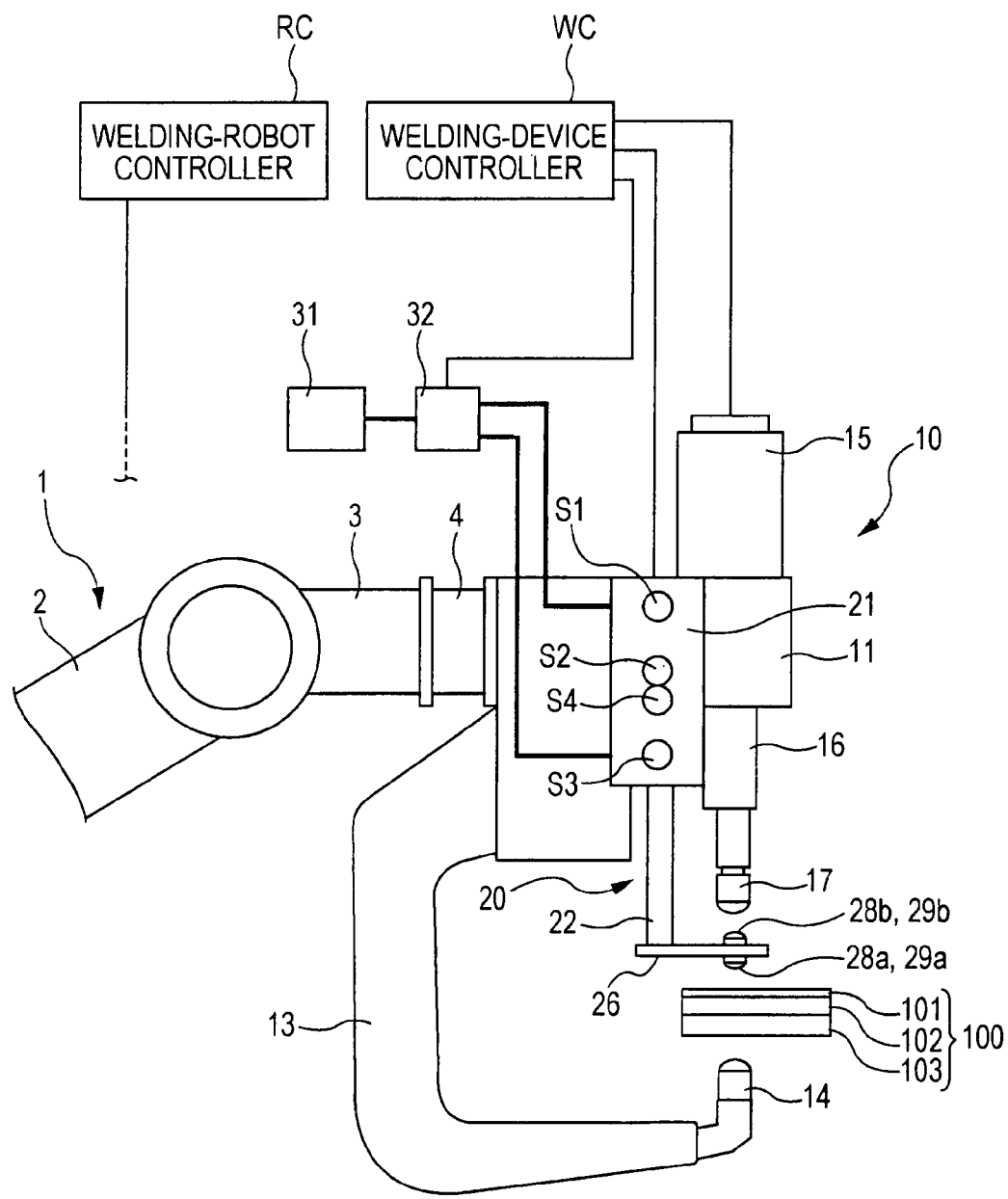
FIG. 1 illustrates the configuration of a spot-welding device according to a first embodiment.
Figure 2:
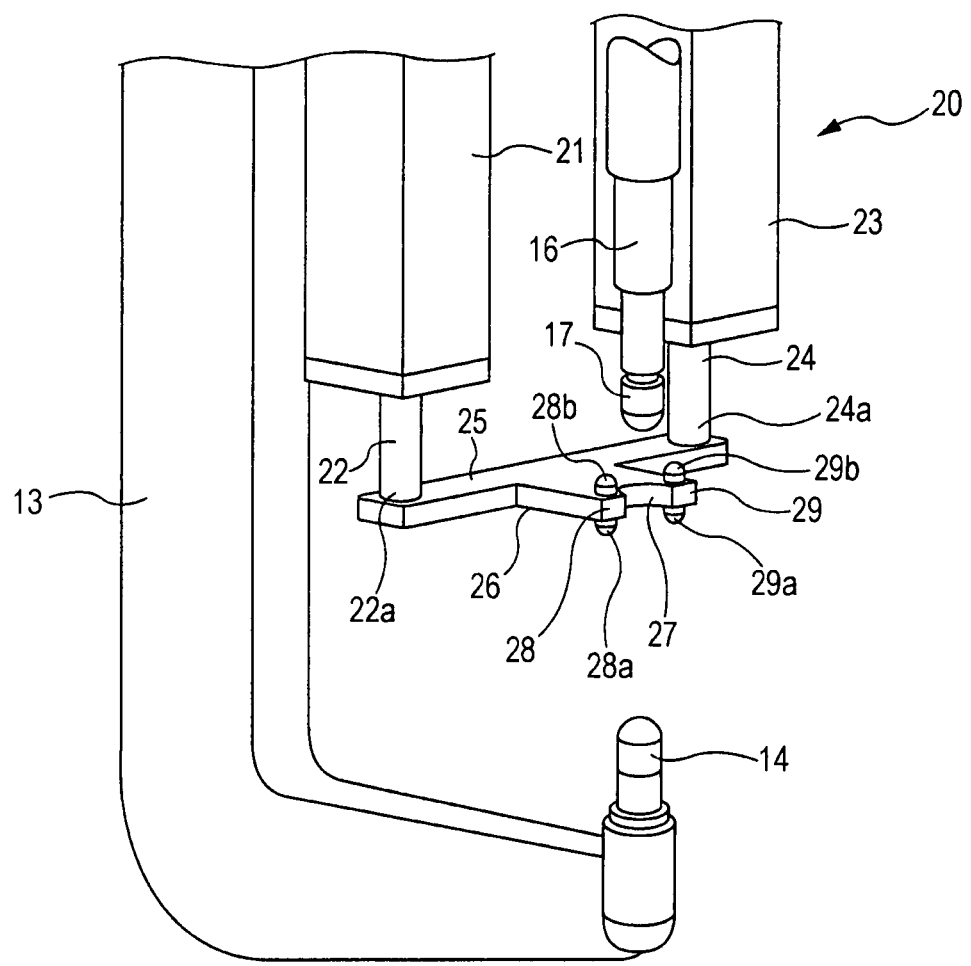
FIG. 2 is an enlarged perspective view of a relevant part of the spot-welding device.

A first embodiment of the present invention will be described below with reference to FIGS. 1 to 8. FIG. 1 illustrates the configuration of a spot-welding device. FIG. 2 illustrates a relevant part of the spot-welding device.

In FIG. 1, reference numeral 1 denotes a welding robot, reference numeral 10 denotes a spot-welding device supported by the welding robot 1, and reference numeral 100 denotes a workpiece to be welded.

Before describing the welding robot 1 and the spot-welding device 10, the workpiece 100 will be described first. The workpiece 100 has a three-stacked-plate structure formed by stacking a thin plate over one of two stacked thick plates. For example, in the following order from the top, the three-stacked-plate structure includes a thin plate 101 having low rigidity, and a first thick plate 102 and a second thick plate 103 that are thicker and more rigid than the thin plate 101.

The welding robot 1 is, for example, an articulated robot and has a base portion fixed to the ground (not shown), a plurality of arms 2, and a wrist 3 attached to an end of the arms 2. The welding robot 1 is capable of three-dimensionally moving the spot-welding device 10 supported by the wrist 3 via an equalizer unit 4. The equalizer unit 4 is interposed between the spot-welding device 10 and the wrist 3 and supports the spot-welding device 10 to the arms 2 in a movable manner in response to a reaction force generated when the spot-welding device 10 applies pressure onto the workpiece 100.

The welding robot 1 sequentially moves the spot-welding device 10 to each preset spot-welding position, that is, a weld section, of the workpiece 100 held at a predetermined position by a clamper (not shown) so as to spot-weld the workpiece 100.

The spot-welding device 10 includes a base 11 attached to the wrist 3 via the equalizer unit 4. A C-shaped yoke 13 extending downward is attached to the base 11. A fixed electrode 14 serving as a first welding electrode is attached to a lower end of the C-shaped yoke 13.

A cylinder unit, a servomotor, or a pressure actuator 15 with a servomotor as a driving source in this embodiment is attached to an upper end of the base 11. A rod 16 that is movable toward and away from the fixed electrode 14 along the axis of the fixed electrode 14 by actuating the pressure actuator 15 protrudes downward from the base 11. A movable electrode 17 serving as a second welding electrode that is disposed facing the fixed electrode 14 and that is movable toward and away from the fixed electrode 14 along the axis thereof is attached to the tip end of the rod 16. Thus, the movable electrode 17 can be moved toward and away from the fixed electrode 14 between a pressing position corresponding to a descended end and a retreated position corresponding to an ascended end by actuating the pressure actuator 15. Specifically, at the retreated position, the movable electrode 17 is positioned away from the fixed electrode 14. At the pressing position, the movable electrode 17 is positioned near towards the fixed electrode 14 so as to clamp the workpiece 100 together with the fixed electrode 14 and to apply pressure onto the workpiece 100.

The base 11 is provided with control-pressure applying unit 20 that applies control pressure to a position adjacent to the movable electrode 17, that is, a position near the welding position, on the thin plate 101 of the workpiece 100 clamped and pressed between the fixed electrode 14 and the movable electrode 17.

As shown in FIG. 1 and in FIG. 2 illustrating an enlarged perspective view of the relevant part, the control-pressure applying unit 20 includes air cylinders 21 and 23 serving as a pair of control-pressure actuators extending parallel to the moving direction of the rod 16. The air cylinders 21 and 23 are separated from each other with the rod 16 therebetween and have their base ends attached to opposite sides of the base 11 at the C-shaped yoke 13 side. The air cylinders 21 and 23 selectively supply air from an air supply source 31 to respective expansion air chambers or contraction air chambers via an air-supply switch valve 32 so as to expand or contract cylinder rods 22 and 24 respectively protruding from the tip ends of the air cylinders 21 and 23, and also maintain the air in the contraction air chambers or the expansion air chambers so as to hold the cylinder rods 22 and 24 at the corresponding position.

A connection plate 25 is bridged between tip ends 22a and 24a of the cylinder rods 22 and 24 protruding from the tip ends of the air cylinders 21 and 23, respectively. The connection plate 25 is provided with a strip-like workpiece holder 26 whose base end is connected to a central section of the connection plate 25, that is, a section of the connection plate 25 between the tip ends 22a and 24a of the cylinder rods 22 and 24, and whose tip end extends away from the C-shaped yoke 13. The tip end of the workpiece holder 26 is provided with an electrode insertion section 27 into which the movable electrode 17 and the fixed electrode 14 can be inserted. The electrode insertion section 27 is formed by cutting out the end of the workpiece holder 26 into an arc shape or a recessed shape. Moreover, two regulators 28 and 29 respectively protrude from opposite sides of the electrode insertion section 27. The lower surfaces of the regulators 28 and 29 are respectively provided with convex regulating surface pieces 28a and 29a serving as control pressers and whose top portions protrude in a semispherical shape. The upper surfaces of the regulators 28 and 29 are respectively provided with convexed regulating surface pieces 28b and 29b. The regulating surface pieces 28a and 29a and the regulating surface pieces 28b and 29b are preferably adjacent to the axis of the movable electrode 17 and are preferably provided at symmetric positions with respect to the axis of the movable electrode 17.

The air cylinders 21 and 23 include a first-retreated-position detection sensor S1 that detects a first retreated position at which the cylinder rods 22 and 24 of the air cylinders 21 and 23 are contracted so that the tip ends thereof are ascended; a first-pressing-position detection sensor S2 that detects a first pressing position, which corresponds to an expanded position of the air cylinders 21 and 23 in a state where the regulating surface pieces 28a and 29a are in pressure contact from above with the upper surface of the workpiece 100 clamped by the fixed electrode 14 and the movable electrode 17; a second-retreated-position detection sensor S3 that detects a second retreated position at which the cylinder rods 22 and 24 of the air cylinders 21 and 23 are expanded so that the tip ends thereof are descended; and a second-pressing-position detection sensor S4 that detects a second pressing position, which corresponds to an expanded position of the air cylinders 21 and 23 in a state where the regulating surface pieces 28b and 29b are in pressure contact from below with the lower surface of the workpiece 100 clamped by the fixed electrode 14 and the movable electrode 17.

A welding-robot controller RC stores teaching data for the welding robot 1. The teaching data contains an operation program for sequentially spot-welding the welding spots of the workpiece 100, and spot-welding positions, that is, the positions and orientations of the spot-welding device 10 for when spot-welding the welding spots. A welding-device controller WC contains an operation program for the spot-welding device 10 and performs operation control of the air-supply switch valve 32 on the basis of the detection results of the first-retreated-position detection sensor S1, the first-pressing-position detection sensor S2, the second-retreated-position detection sensor S3, and the second-pressing-position detection sensor S4.

For example, when the first-retreated-position detection sensor S1 detects that the air cylinders 21 and 23 have reached the first retreated position due to contraction of the air cylinders 21 and 23 from an expanded state as a result of air supplied to the respective contraction air chambers, the air-supply switch valve 32 is switched to the first retreated position on the basis of the detection signal. Thus, the supply of air to the contraction air chambers is discontinued, and the air in the contraction air chambers is maintained therein, thereby holding the air cylinders 21 and 23 at the first retreated position.

When the air-supply switch valve 32 is switched from the first retreated position so that the air in the contraction air chambers is discharged therefrom and air is supplied to the expansion air chambers, the air cylinders 21 and 23 expand and reach the first pressing position. As the first-pressing-position detection sensor S2 detects that the air cylinders 21 and 23 have reached the first pressing position, the air-supply switch valve 32 is switched to the first pressing position on the basis of the detection signal. Thus, the supply of air to the expansion air chambers is discontinued, and the air in the expansion air chambers is maintained therein, thereby holding the air cylinders 21 and 23 at the first pressing position.

When the second-retreated-position detection sensor S3 detects that the air cylinders 21 and 23 have reached the second retreated position due to expansion of the air cylinders 21 and 23 as a result of air supplied to the respective expansion air chambers, the air-supply switch valve 32 is switched to the second retreated position on the basis of the detection signal. Thus, the supply of air to the expansion air chambers is discontinued, and the air in the expansion air chambers is maintained therein, thereby holding the air cylinders 21 and 23 at the second retreated position. When the air-supply switch valve 32 is switched from the second retreated position so that the air in the expansion air chambers is discharged therefrom and air is supplied to the contraction air chambers, the air cylinders 21 and 23 contract and reach the second pressing position. As the second-pressing-position detection sensor S4 detects that the air cylinders 21 and 23 have reached the second pressing position, the air-supply switch valve 32 is switched to the second pressing position on the basis of the detection signal. Thus, the supply of air to the contraction air chambers is discontinued, and the air in the contraction air chambers is maintained therein, thereby holding the air cylinders 21 and 23 at the second pressing position.

Figure 4:
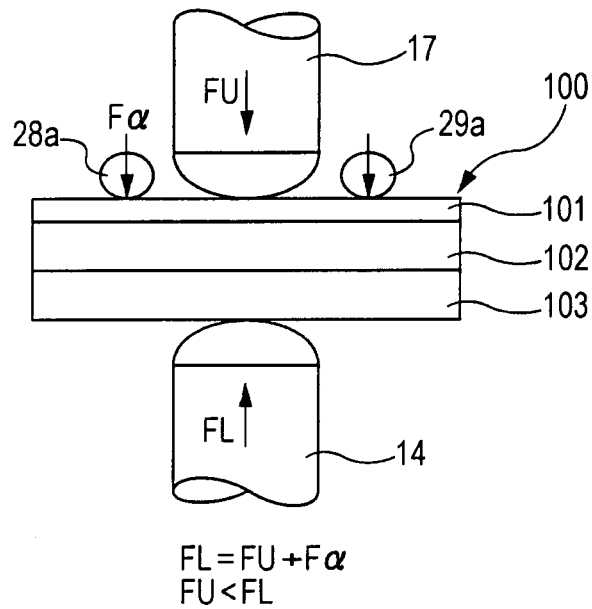
FIG. 4 is an operation diagram thereof.
Figure 5:
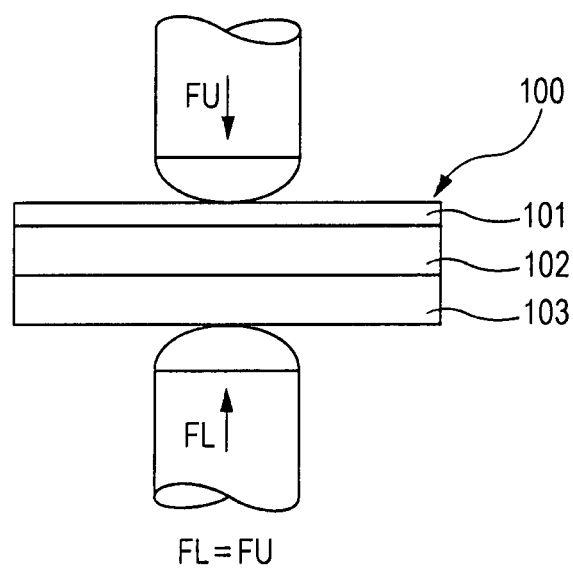
FIG. 5 is an operation diagram of a comparative example.

Next, the operation of the spot-welding device 10 will be described. For the sake of convenience, a first description corresponding to when the workpiece 100 to be spot-welded has a three-stacked-plate structure including the thin plate 101, the first thick plate 102, and the second thick plate 103 in that order from the top will be provided below with reference to FIGS. 3A to 3G, FIG. 4, and FIG. 5. Specifically, FIGS. 3A to 3G illustrate operation steps of the spot-welding device 10, FIG. 4 is an operation diagram thereof, and FIG. 5 is an operation diagram of a comparative example. Then, a second description corresponding to when the workpiece 100 has a three-stacked-plate structure including the thin plate 101, the first thick plate 102, and the second thick plate 103 in that order from the bottom will be provided below with reference to FIGS. 6A to 6G and FIG. 7. Specifically, FIGS. 6A to 6G illustrate operation steps of the spot-welding device 10, and FIG. 7 is an operation diagram thereof.

Figure 3A:
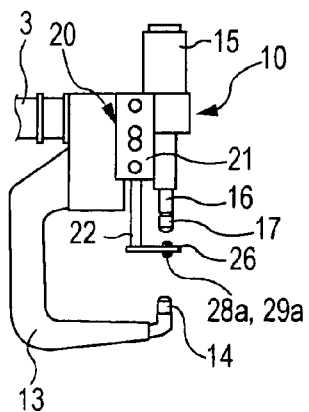
FIGS. 3A to 3G illustrate operation steps of the spot-welding device.
Figure 3B:
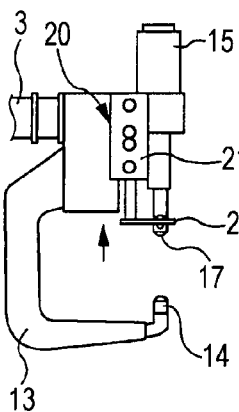

With regard to spot-welding the workpiece 100 including the thin plate 101, the first thick plate 102, and the second thick plate 103 in that order from the top, a state in which the movable electrode 17 is at a retreated position located away from the fixed electrode 14 and in which the workpiece holder 26 of the control-pressure applying unit 20 is held near the movable electrode 17 is confirmed, more specifically, a state in which the air cylinders 21 and 23 are expanded and are detected not to be at the first retreated position by the first-retreated-position detection sensor S1 is confirmed in accordance with a preset operation program, as shown in FIG. 3A. In other words, when the position of the workpiece holder 26 is confirmed, the air-supply switch valve 32 is switched in response to an operation signal from the welding-device controller WC so as to start supplying air to the contraction air chambers of the air cylinders 21 and 23, thereby causing the air cylinders 21 and 23 to contract. The contraction of the air cylinders 21 and 23 causes the workpiece holder 26 to ascend above the tip end of the movable electrode 17. Then, when the air cylinders 21 and 23 contracted as shown in FIG. 3B reach the first retreated position, the first-retreated-position detection sensor S1 detects the air cylinders 21 and 23. Thus, the air-supply switch valve 32 is switched to the first retreated position so that the supply of air to the contraction air chambers of the air cylinders 21 and 23 is discontinued, and the air in the contraction air chambers is maintained therein. Consequently, the workpiece holder 26 is held at the first retreated position.

Subsequently, when it is confirmed that the air cylinders 21 and 23 are at the first retreated position on the basis of the detection signal from the first-retreated-position detection sensor S1, the welding-robot controller RC actuates the welding robot 1 so as to move the spot-welding device 10 to a spot-welding position of the workpiece 100 in accordance with a preset program. Consequently, a weld section of the workpiece 100 is positioned between the fixed electrode 14 and the movable electrode 17 as well as between the regulating surface pieces 28a and 29a, and the fixed electrode 14 is positioned at a specific position of the second thick plate 103 that corresponds to the spot-welding position, as shown in FIG. 3C.

Figure 3C:
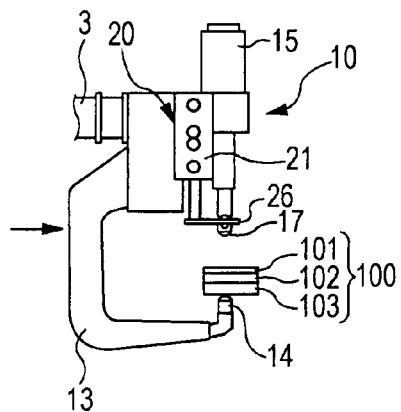

In the state where the spot-welding device 10 is positioned at the welding position, the tip end of the fixed electrode 14 is in contact with the second thick plate 103 of the workpiece 100 from below, whereas the tip end of the movable electrode 17 and the regulating surface pieces 28a and 29a face the thin plate 101 with a gap therebetween, as shown in FIG. 3C.

Figure 3D:
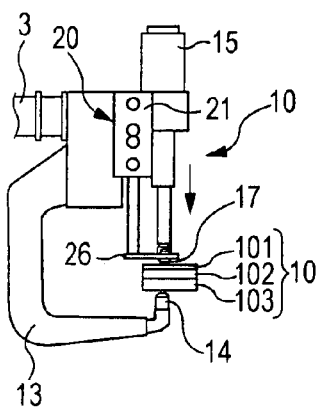

Subsequently, referring to FIG. 3D, the pressure actuator 15 is actuated in the state where the fixed electrode 14 is in contact with the second thick plate 103 of the workpiece 100, so that the movable electrode 17 is moved from the retreated position toward a pressing position to approach the fixed electrode 14, whereby the movable electrode 17 comes into pressure contact with the thin plate 101. Thus, the pressure of the pressure actuator 15 is applied to the fixed electrode 14 and the movable electrode 17 via the base 11, whereby the weld section of the workpiece 100 is clamped and pressed between the movable electrode 17 and the fixed electrode 14.

On the other hand, the air-supply switch valve 32 is switched so that the air in the contraction air chambers of the air cylinders 21 and 23 is discharged therefrom and air is supplied to the expansion air chambers. This causes the air cylinders 21 and 23 to expand and the workpiece holder 26 to descend, whereby the regulating surface pieces 28a and 29a are set adjacent to the movable electrode 17 and come into pressure contact with the thin plate 101 of the workpiece 100 from above. Moreover, when the expanded air cylinders 21 and 23 reach the first pressing position, the first-pressing-position detection sensor S2 detects the air cylinders 21 and 23. Then, the air-supply switch valve 32 is switched to the first pressing position so that the supply of air to the expansion air chambers of the air cylinders 21 and 23 is discontinued, and the air in the expansion air chambers is maintained therein. Consequently, the workpiece holder 26 is held at the first pressing position.

In this state where the workpiece 100 is clamped and pressed between the fixed electrode 14 and the movable electrode 17, and the regulating surface pieces 28a and 29a set adjacent to the movable electrode 17 apply pressure to the thin plate 101 due to the air cylinders 21 and 23, a pressure FL from the fixed electrode 14 is applied to the second thick plate 103 of the workpiece 100 from below, and a pressure FU from the movable electrode 17 and a control pressure $F\alpha$ from the regulating surface pieces 28a and 29a, set adjacent to the movable electrode 17, due to the air cylinders 21 and 23 are applied to the thin plate 101, as shown in FIG. 4 which is a schematic operation diagram.

In this case, the pressure of the pressure actuator 15 and the control pressure of the air cylinders 21 and 23 are applied to the movable electrode 17 and the regulating surface pieces 28a and 29a, and to the fixed electrode 14 via the base 11 and the C-shaped yoke 13. The pressure FL applied to the second thick plate 103 by the fixed electrode 14 is equal to the sum of the pressure FU applied by the movable electrode 17 and the control pressure $F\alpha$ applied by the regulating surface pieces 28a and 29a to the thin plate 101 ($FL=FU+F\alpha$).

Consequently, the workpiece 100 is stably clamped and held by the pressure FL applied to the second thick plate 103 by the fixed electrode 14 from below, the pressure FU applied to the thin plate 101 by the movable electrode 17 from above, and the control pressure $F\alpha$ applied to the thin plate 101 by the regulating surface pieces 28a and 29a from above.

In the weld section of the workpiece 100, on the other hand, the pressure FL from the fixed electrode 14 is applied to the second thick plate 103, whereas the pressure FU applied to the thin plate 101 by the movable electrode 17 is equal to a difference between the pressure FL from the fixed electrode 14 and the control pressure $F\alpha$ from the regulating surface pieces 28a and 29a ($FU=FL-F\alpha$).

By setting the pressure FU from the movable electrode 17 located at the thin plate 101 side to be smaller than the pressure FL from the fixed electrode 14 located at the second thick plate 103 side (FU<FL), the contact pressure at the joint section between the thin plate 101 and the first thick plate 102 becomes smaller than the contact pressure at the joint section between the first thick plate 102 and the second thick plate 103. Consequently, the contact resistance between the thin plate 101 and the first thick plate 102 relatively increases, whereas the contact resistance between the first thick plate 102 and the second thick plate 103 relatively decreases.

For example, supposing that the spot-welding device 10 is not equipped with the control-pressure applying unit 20, the pressure actuator 15 is actuated in a state where the fixed electrode 14 is in contact with the second thick plate 103 of the workpiece 100 so as to bring the movable electrode 17 into pressure contact with the thin plate 101, thereby clamping and pressing the weld section of the workpiece 100 between the fixed electrode 14 and the movable electrode 17. Referring to FIG. 5 schematically illustrating a comparative example, the pressure of the pressure actuator 15 is uniformly applied to the movable electrode 17 and the fixed electrode 14 via the base 11 and the C-shaped yoke 13 so that the pressure FL is applied to the second thick plate 103 by the fixed electrode 14 and the pressure FU is applied to the thin plate 101 by the movable electrode 17.

Figure 3E:
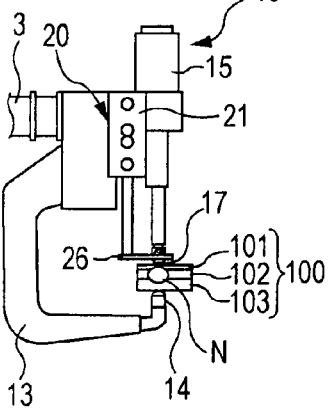

Next, in the state where the workpiece 100 is clamped and pressed between the fixed electrode 14 and the movable electrode 17, and the control pressure from the regulating surface pieces 28a and 29a is applied to the workpiece 100 such that the pressure FU from the movable electrode 17 located at the thin plate 101 side is smaller than the pressure FL from the fixed electrode 14 located at the second thick plate 103 side, welding is performed by applying electricity between the movable electrode 17 and the fixed electrode 14 for a predetermined time, as shown in FIG. 3E. When the electricity is applied between the movable electrode 17 and the fixed electrode 14, the contact resistance at the joint section between the thin plate 101 and the first thick plate 102 relatively increases and the current density becomes higher, whereas the contact resistance-between the first thick plate 102 and the second thick plate 103 is maintained at a small value. Thus, the calorific value at the joint section between the thin plate 101 and the first thick plate 102 becomes relatively higher than the calorific value at the joint section between the first thick plate 102 and the second thick plate 103. Consequently, a good nugget extending from the thin plate 101 to the second thick plate 103 without uneven current density is formed, thereby ensuring the weld strength of the thin plate 101.

Figure 3F:
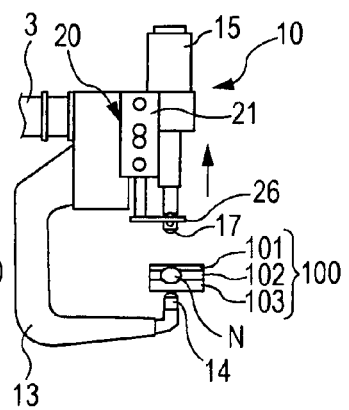

After the welding process is completed, the pressure actuator 15 is actuated so that the movable electrode 17 is moved from the pressing position towards the retreated position, thereby releasing the clamped state of the workpiece 100 between the fixed electrode 14 and the movable electrode 17. On the other hand, the air-supply switch valve 32 is switched so that the air in the expansion air chambers of the air cylinders 21 and 23 is discharged therefrom and air is supplied to the contraction air chambers, thereby causing the air cylinders 21 and 23 to contract. The contraction of the air cylinders 21 and 23 causes the workpiece holder 26 to ascend above the tip end of the movable electrode 17. Then, when the air cylinders 21 and 23 contracted as shown in FIG. 3F reach the first retreated position, the first-retreated-position detection sensor S1 detects the air cylinders 21 and 23. Thus, the air-supply switch valve 32 is switched to the first retreated position so that the supply of air to the contraction air chambers of the air cylinders 21 and 23 is discontinued, and the air in the contraction air chambers is maintained therein. Consequently, the workpiece holder 26 is held at the first retreated position.

Figure 3G:
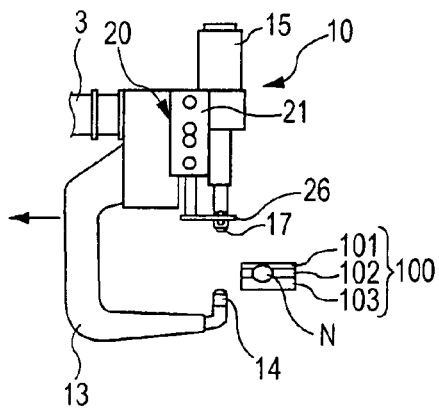

Subsequently, when it is confirmed that the air cylinders 21 and 23 are at the first retreated position on the basis of the detection signal from the first-retreated-position detection sensor S1, the welding robot 1 is actuated, as shown in FIG. 3G, so as to move the spot-welding device 10 away from the current workpiece 100 to a spot-welding position of a subsequent workpiece 100.

Next, the second description corresponding to when the workpiece 100 has a three-stacked-plate structure including the thin plate 101, the first thick plate 102, and the second thick plate 103 in that order from the bottom will be provided below with reference to FIGS. 6A to 6G illustrating the operation steps of the spot-welding device 10 and FIG. 7 illustrating the operation thereof.

Figure 6A:
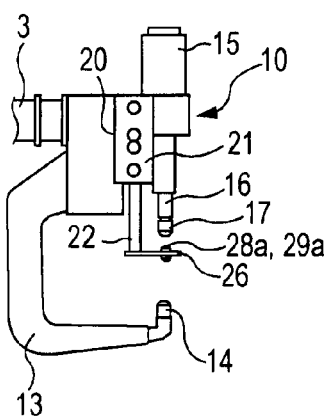
FIGS. 6A to 6G illustrate operation steps of the spot-welding device.
Figure 7:
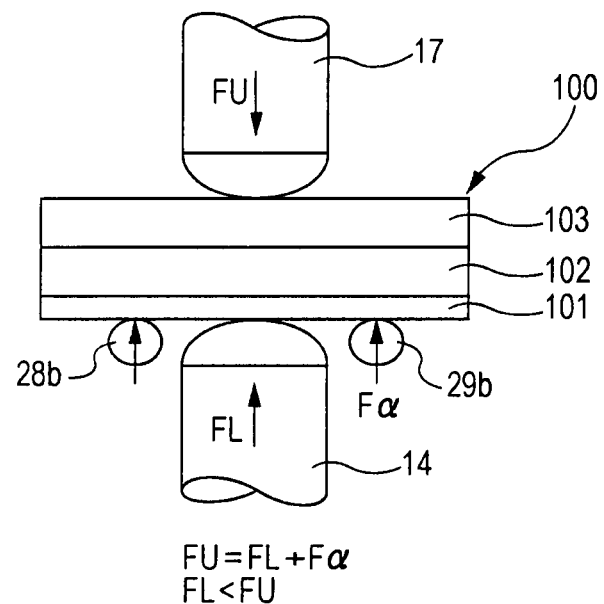
FIG. 7 is an operation diagram thereof.
Figure 8:
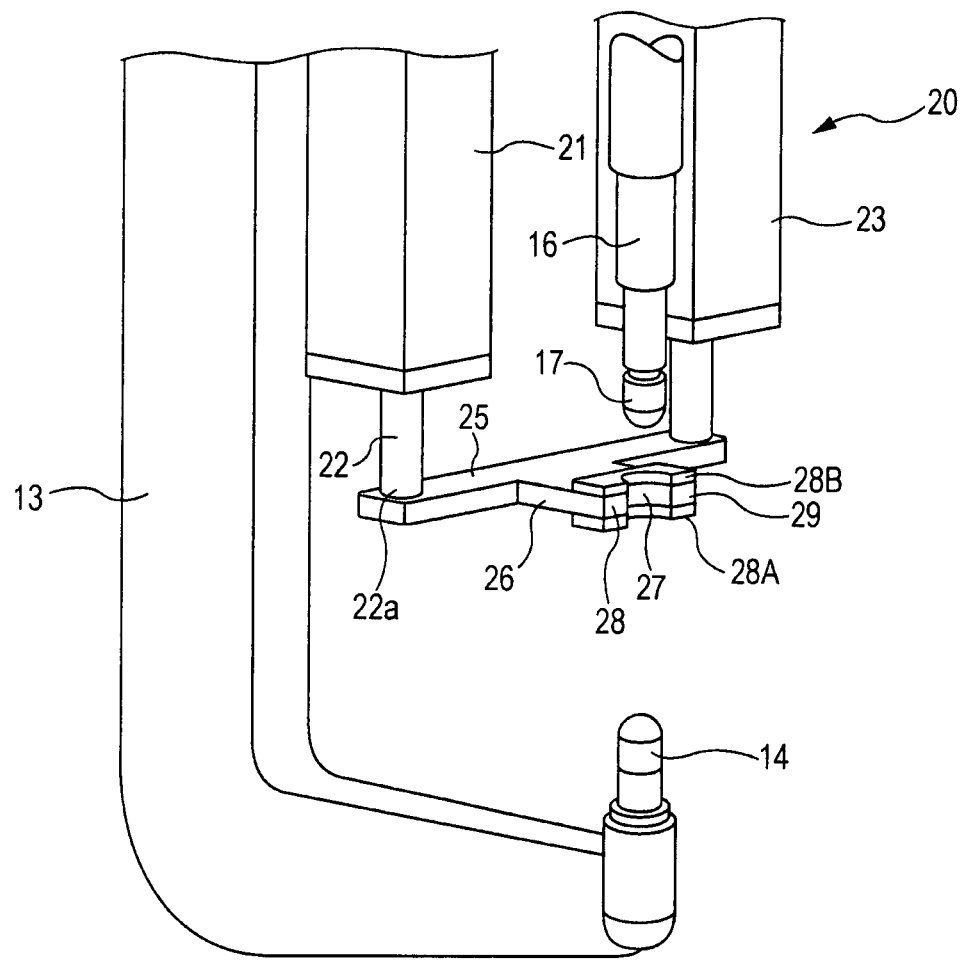
FIG. 8 is an enlarged perspective view of a relevant part of the spot-welding device.

With regard to spot-welding the workpiece 100 including the thin plate 101, the first thick plate 102, and the second thick plate 103 in that order from the bottom, when a state in which the movable electrode 17 is at a retreated position located away from the fixed electrode 14 and in which the workpiece holder 26 of the control-pressure applying unit 20 is held near the movable electrode 17 is confirmed, more specifically, when a state in which the air cylinders 21 and 23 are detected not to be at the second retreated position by the second-retreated-position detection sensor S3 is confirmed in accordance with a preset operation program, as shown in FIG. 6A, the air-supply switch valve 32 is switched so as to start supplying air to the expansion air chambers of the air cylinders 21 and 23, thereby causing the air cylinders 21 and 23 to expand.

Figure 6B:
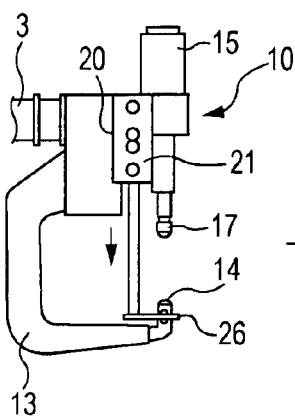

The expansion of the air cylinders 21 and 23 causes the workpiece holder 26 to descend below the tip end of the fixed electrode 14. Then, the second-retreated-position detection sensor S3 detects that the air cylinders 21 and 23 expanded as shown in FIG. 6B have reached the second retreated position. Thus, the air-supply switch valve 32 is switched to the second retreated position so that the supply of air to the expansion air chambers of the air cylinders 21 and 23 is discontinued, and the air in the expansion air chambers is maintained therein. Consequently, the workpiece holder 26 is held at the second retreated position.

Subsequently, when it is confirmed that the air cylinders 21 and 23 are at the second retreated position on the basis of the detection signal from the second-retreated-position detection sensor S3, the welding robot 1 is actuated so as to move the spot-welding device 10 to a spot-welding position of the workpiece 100 in accordance with a preset program. Consequently, a weld section of the workpiece 100 is positioned between the fixed electrode 14 and the movable electrode 17 as well as between the regulating surface pieces 28b and 29b, and the fixed electrode 14 is positioned in contact with a specific position of the thin plate 101 that corresponds to the spot-welding position, as shown in FIG. 6C.

Figure 6C:
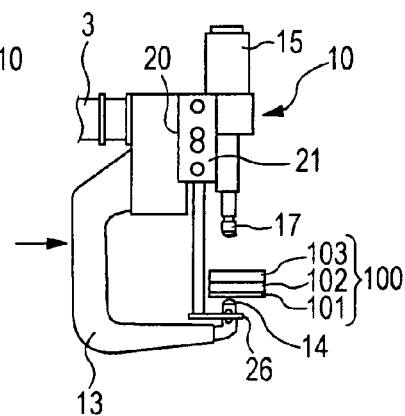

In the state where the spot-welding device 10 is positioned at the welding position, the tip end of the fixed electrode 14 is in contact with the thin plate 101 of the workpiece 100 from below, whereas the tip end of the movable electrode 17 faces the second thick plate 103 with a gap therebetween, and the regulating surface pieces 28a and 29a face the thin plate 101 with a gap therebetween, as shown in FIG. 6C.

Figure 6D:
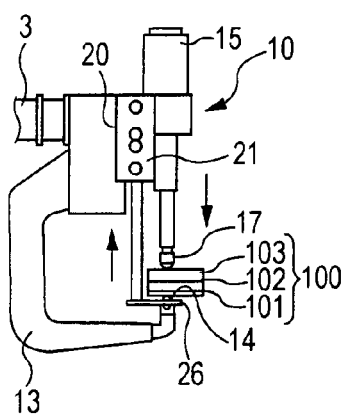

Subsequently, referring to FIG. 6D, the pressure actuator 15 is actuated in the state where the fixed electrode 14 is in contact with the thin plate 101 of the workpiece 100, so that the movable electrode 17 is moved from the retreated position toward a pressing position, whereby the movable electrode 17 comes into pressure contact with the second thick plate 103. Thus, the weld section of the workpiece 100 is clamped and pressed between the movable electrode 17 and the fixed electrode 14.

On the other hand, the air-supply switch valve 32 is switched so that the air in the expansion air chambers of the air cylinders 21 and 23 is discharged therefrom and air is supplied to the contraction air chambers. This causes the air cylinders 21 and 23 to contract and the workpiece holder 26 to ascend, whereby the regulating surface pieces 28b and 29b are set adjacent to the fixed electrode 14 and come into pressure contact with the thin plate 101 of the workpiece 100 from below. Moreover, when the contracted air cylinders 21 and 23 reach the second pressing position, the second-pressing-position detection sensor S4 detects the air cylinders 21 and 23. Then, the air-supply switch valve 32 is switched to the second pressing position so that the supply of air to the contraction air chambers of the air cylinders 21 and 23 is discontinued, and the air in the contraction air chambers is maintained therein. Consequently, the workpiece holder 26 is held at the second pressing position.

In this state where the workpiece 100 is clamped and pressed between the fixed electrode 14 and the movable electrode 17, and the regulating surface pieces 28b and 29b apply control pressure to the thin plate 101 due to the air cylinders 21 and 23, the pressure FU from the movable electrode 17 is applied to the second thick plate 103 of the workpiece 100 from above, and the pressure FL from the fixed electrode 14 and the control pressure Fα from the regulating surface pieces 28b and 29b due to the air cylinders 21 and 23 are applied to the thin plate 101 from below, as shown in FIG. 7 which is a schematic operation diagram.

In this case, the pressure of the pressure actuator 15 is applied to the movable electrode 17 and to the fixed electrode 14 via the base 11 and the C-shaped yoke 13, and the control pressure of the air cylinders 21 and 23 is applied to the regulating surface pieces 28b and 29b and to the movable electrode 17 via the base 11. The pressure FU applied to the second thick plate 103 by the movable electrode 17 is equal to the sum of the pressure FL applied by the fixed electrode 14 and the control pressure Fα applied by the regulating surface pieces 28b and 29b to the thin plate 101 (FU=FL+Fα). Consequently, the workpiece 100 is stably held by the fixed electrode 14, the movable electrode 17, and the regulating surface pieces 28b and 29b.

On the other hand, in the weld section of the workpiece 100, the pressure FU from the movable electrode 17 is applied to the second thick plate 103, whereas the pressure FL applied to the thin plate 101 by the fixed electrode 14 is equal to a difference between the pressure FU from the movable electrode 17 and the control pressure Fα from the regulating surface pieces 28b and 29b (FL=FU−Fα).

By setting the pressure FL from the fixed electrode 14 located at the thin plate 101 side to be smaller than the pressure FU from the movable electrode 17 located at the second thick plate 103 side (FL<FU), the contact pressure at the joint section between the thin plate 101 and the first thick plate 102 becomes smaller than the contact pressure at the joint section between the first thick plate 102 and the second thick plate 103. Consequently, the contact resistance between the thin plate 101 and the first thick plate 102 relatively increases, whereas the contact resistance between the first thick plate 102 and the second thick plate 103 relatively decreases.

Figure 6E:
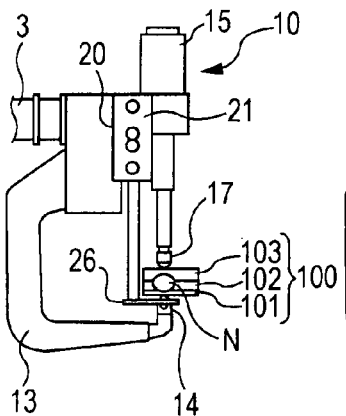

In the state where the workpiece 100 is clamped and pressed between the fixed electrode 14 and the movable electrode 17, and the control pressure Fα from the regulating surface pieces 28b and 29b is applied to the workpiece 100, welding is performed by applying electricity between the movable electrode 17 and the fixed electrode 14 for a predetermined time, as shown in FIG. 6E. When the electricity is applied between the movable electrode 17 and the fixed electrode 14, the contact resistance at the joint section between the thin plate 101 and the first thick plate 102 relatively increases and the current density becomes higher, whereas the contact resistance between the first thick plate 102 and the second thick plate 103 relatively decreases. Thus, the calorific value at the joint section between the thin plate 101 and the first thick plate 102 becomes relatively higher than the calorific value at the joint section between the first thick plate 102 and the second thick plate 103. Consequently, a good nugget N extending from the thin plate 101 to the second thick plate 103 without an uneven amount of weld penetration is formed, thereby ensuring the weld strength of the thin plate 101.

Figure 6F:
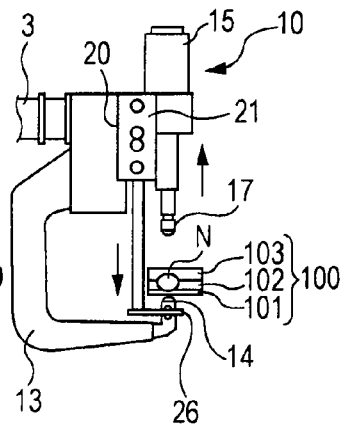

After the welding process is completed, the pressure actuator 15 is actuated so that the movable electrode 17 is moved from the pressing position towards the retreated position, thereby releasing the clamped state of the workpiece 100 between the fixed electrode 14 and the movable electrode 17, as shown in FIG. 6F. On the other hand, the air-supply switch valve 32 is switched so that the air in the contraction air chambers of the air cylinders 21 and 23 is discharged therefrom and air is supplied to the expansion air chambers, thereby causing the air cylinders 21 and 23 to expand. The expansion of the air cylinders 21 and 23 causes the workpiece holder 26 to descend below the tip end of the fixed electrode 14. Then, when the air cylinders 21 and 23 expanded as shown in FIG. 6F reach the second retreated position, the second-retreated-position detection sensor S3 detects the air cylinders 21 and 23. Thus, the air-supply switch valve 32 is switched to the second retreated position so that the supply of air to the expansion air chambers of the air cylinders 21 and 23 is discontinued, and the air in the expansion air chambers is maintained therein. Consequently, the workpiece holder 26 is held at the second retreated position.

Figure 6G:
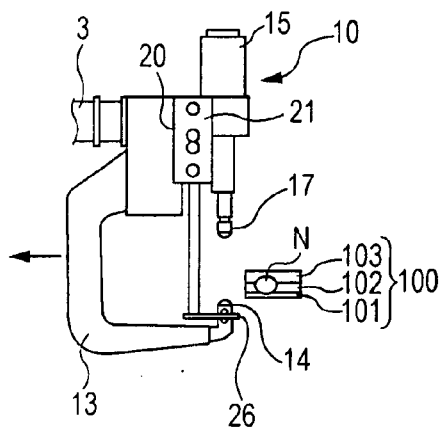

Subsequently, when it is confirmed that the air cylinders 21 and 23 are at the second retreated position on the basis of the detection signal from the second-retreated-position detection sensor S3, the welding robot 1 is actuated, as shown in FIG. 6G, so as to move the spot-welding device 10 away from the spot-welding position of the current workpiece 100 and then to move the spot-welding device 10 to a spot-welding position of a subsequent workpiece 100.

According to the first embodiment having the above-described configuration, the spot-welding device 10 that spot-welds the workpiece 100 having a three-stacked-plate structure including the thin plate 101 having low rigidity, and the first thick plate 102 and the second thick plate 103 that are more rigid than the thin plate 101 includes the fixed electrode 14 provided at the base 11 via the C-shaped yoke 13, the movable electrode 17 that is provided at the base 11 and that is moved toward and away from the fixed electrode 14 by the pressure actuator 15, and the control-pressure applying unit 20 that applies control pressure to the weld section of the thin plate 101 of the workpiece 100 clamped and pressed between the fixed electrode 14 and the movable electrode 17. The pressure FL and the pressure FU are applied to the workpiece 100 from the fixed electrode 14 and the movable electrode 17, respectively, and the control pressure Fα is applied to near the welding position of the workpiece 100, so that the contact pressure between the thin plate 101 and the first thick plate 102 is controlled to be lower than the contact pressure between the first thick plate 102 and the second thick plate 103, whereby the current density at the joint section between the thin plate 101 and the first thick plate 102 becomes relatively higher than the current density at the joint section between the first thick plate 102 and the second thick plate 103 when electricity is applied to the movable electrode 17 and the fixed electrode 14. Consequently, a good nugget extending from the thin plate 101 to the second thick plate 103 without uneven weld penetration is formed, thereby ensuring the weld strength of the thin plate 101. In particular, since the workpiece 100 clamped and pressed between the fixed electrode 14 and the movable electrode 17 receives the pressure FL from the fixed electrode 14, the pressure FU from the movable electrode 17, and the control pressure Fα to the joint section of the workpiece 100, good nuggets extending from the thin plate 101 to the second thick plate 103 without unevenness can be formed at various welding positions without being affected by a clamping position where the workpiece 100 is clamped, thereby ensuring the weld quality.

The present invention is not limited to this embodiment and permits various modifications without departing from the scope of the invention. For example, although the above embodiment is directed to an example in which the air cylinders 21 and 23 are used as control-pressure actuators, a servomotor or the like may be used as an alternative.

Furthermore, although the convexed regulating surface pieces 28a, 29a, 28b, and 29b serve as an example of control pressers in the above description, various modifications are permissible in accordance with the shape of the workpiece 100. For example, referring to FIG. 8 corresponding to FIG. 2, the control pressers may alternatively be defined by a semi-arc-shaped regulating surface piece 28A and a semi-arc-shaped regulating surface piece 28B formed on the connection plate 25 bridged between the tip ends 22a and 24a of the cylinder rods 22 and 24 respectively protruding from the tip ends of the air cylinders 21 and 23. Specifically, the semi-arc-shaped regulating surface piece 28A extends along the electrode insertion section 27 from the lower surface of the regulators 28 and 29 that are formed along the electrode insertion section 27, which is formed by cutting out the end of the protruding workpiece holder 26 into an arc shape or a recessed shape. The semi-arc-shaped regulating surface piece 28B extends along the electrode insertion section 27 from the upper surface of the regulators 28 and 29.

Second Embodiment

Figure 9:
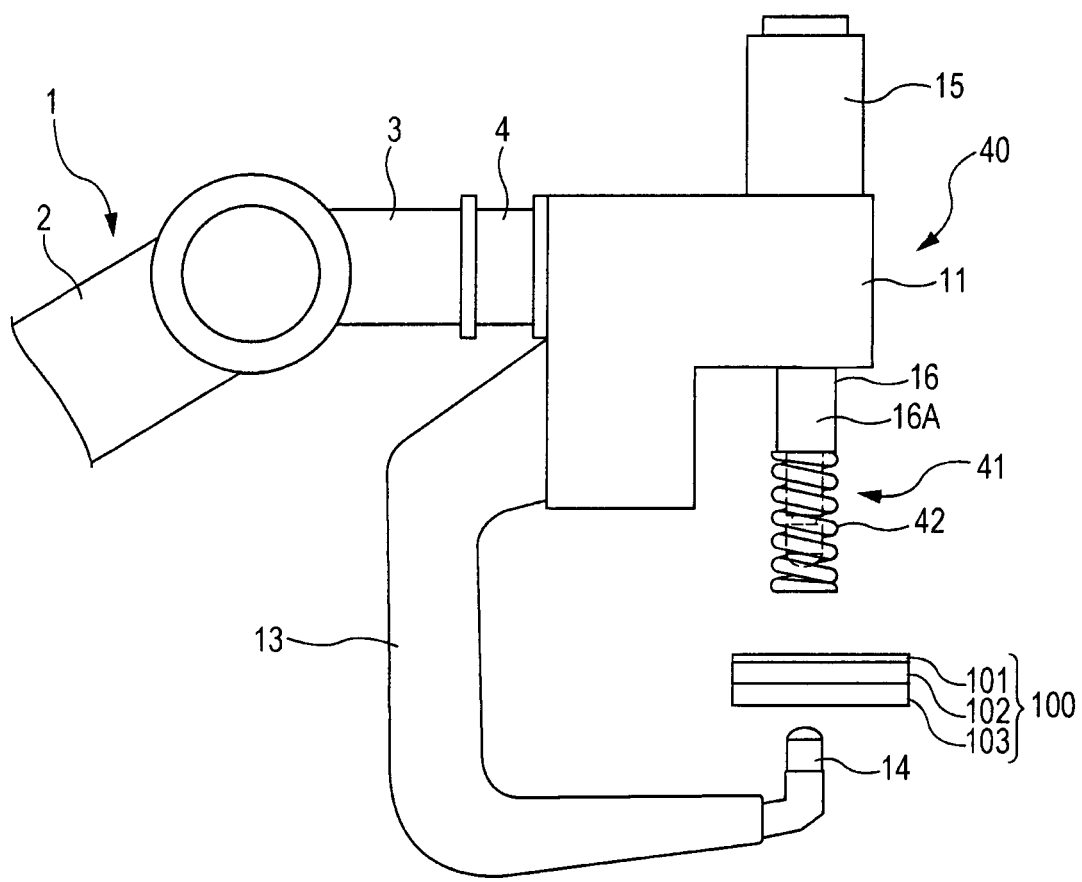
FIG. 9 schematically illustrates a second embodiment.
Figure 10:
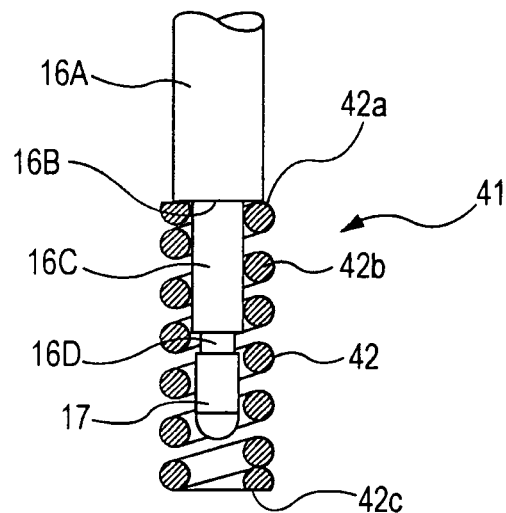
FIG. 10 is an enlarged view of a relevant part of the spot-welding device.
Figure 11:
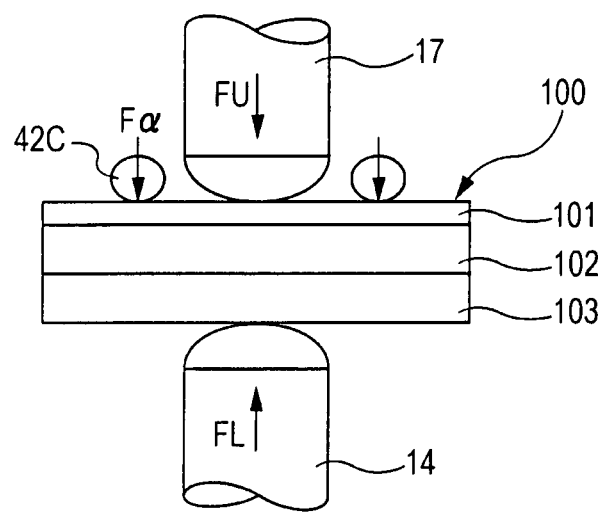
FIG. 11 is an operation diagram thereof.

A second embodiment of the present invention will be described below with reference to FIGS. 9 to 11. FIG. 9 illustrates the configuration of a spot-welding device, FIG. 10 illustrates a relevant part of the spot-welding device, and FIG. 11 is an operation diagram thereof. Components in FIGS. 9 to 11 that correspond to those in FIGS. 1 and 2 are given the same reference numerals, and detailed descriptions thereof will be omitted.

In a spot-welding device 40 according to this embodiment, the control-pressure applying unit 20 in the first embodiment is replaced by control-pressure applying unit 41 supported by the rod 16.

As shown in FIGS. 9 and 10, the rod 16 of the spot-welding device 40 has a columnar shape and includes a base end 16A protruding downward from the base 11 and having a relatively large diameter, a columnar shaft 16C having a smaller diameter than the base end 16A and extending continuously from and coaxially with the base end 16A via a step 16B, and a shank 16D formed at the tip end of the shaft 16C. The movable electrode 17 is fitted to the shank 16D. The shaft 16C has a diameter larger than that of the movable electrode 17.

The control-pressure applying unit 41 is defined by a cylindrical elastic member fittable around the shaft 16C and given an insulating coating. In this embodiment, the control-pressure applying unit 41 is defined by a coil spring 42.

The coil spring 42 has a base end 42a that is in abutment with the step 16B, and a base-end segment 42b that is fitted around the shaft 16C so that the coil spring 42 is attached to the rod 16, and a tip-end segment 42c serving as a control presser. In an unloaded state, the tip-end segment 42c has an effective length protruding from the tip end of the movable electrode 17.

In the spot-welding device 40 equipped with the control-pressure applying unit 41, the pressure actuator 15 is actuated in a state where the fixed electrode 14 is in contact with the second thick plate 103 of the workpiece 100 so as to move the movable electrode 17 toward a pressing position and to bring the movable electrode 17 into pressure contact with the thin plate 101, whereby a weld section of the workpiece 100 is clamped and pressed between the fixed electrode 14 and the movable electrode 17. This causes the tip-end segment 42c of the coil spring 42 to be set annularly adjacent to the tip end of the movable electrode 17 and to come into contact with the thin plate 101, whereby the coil spring 42 becomes compressed. Thus, the tip-end segment 42c in pressure contact with the workpiece 100 due to a reaction force of the coil spring 42 applies a control pressure Fα to the thin plate 101 along the periphery of the movable electrode 17.

In this state where the workpiece 100 is clamped and pressed between the fixed electrode 14 and the movable electrode 17, and the control pressure Fα is applied to the thin plate 101 by the coil spring 42, a pressure FL from the fixed electrode 14 is applied to the second thick plate 103 of the workpiece 100 from below, and a pressure FU from the movable electrode 17 and the control pressure Fα from the coil spring 42 are applied to the thin plate 101, as shown in FIG. 11 which is a schematic operation diagram. In this case, the pressure FL applied to the second thick plate 103 by the fixed electrode 14 is equal to the sum of the pressure FU applied by the movable electrode 17 and the control pressure Fα applied by the coil spring 42 to the thin plate 101 (FL=FU+Fα). In the weld section of the workpiece 100, the pressure FL from the fixed electrode 14 is applied to the second thick plate 103, whereas the pressure FU applied to the thin plate 101 by the movable electrode 17 is equal to a difference between the pressure FL from the fixed electrode 14 and the control pressure Fα from the coil spring 42 (FU=FL−Fα).

By setting the pressure FU from the movable electrode 17 located at the thin plate 101 side to be smaller than the pressure FL from the fixed electrode 14 located at the second thick plate 103 side (FU<FL), the contact resistance between the thin plate 101 and the first thick plate 102 relatively increases and the current density becomes higher when electricity is applied between the movable electrode 17 and the fixed electrode 14, whereas the contact resistance between the first thick plate 102 and the second thick plate 103 is maintained at a small value. Thus, the calorific value between the thin plate 101 and the first thick plate 102 becomes relatively higher than the calorific value between the first thick plate 102 and the second thick plate 103. Consequently, a good nugget N extending from the thin plate 101 to the second thick plate 103 without uneven weld penetration is formed, thereby ensuring the weld quality.

Accordingly, the configuration of the control-pressure applying unit 41 is simple, lightweight, and compact, as compared with that of the control-pressure applying unit 20 in the first embodiment. Thus, the spot-welding device 40 can be used in an area where the workspace is relatively limited, thereby allowing for an increased spot-weldable range. Furthermore, the control pressure Fα can be readily adjusted by changing the specification of the repulsive force of the coil spring 42.

Third Embodiment

Figure 12:
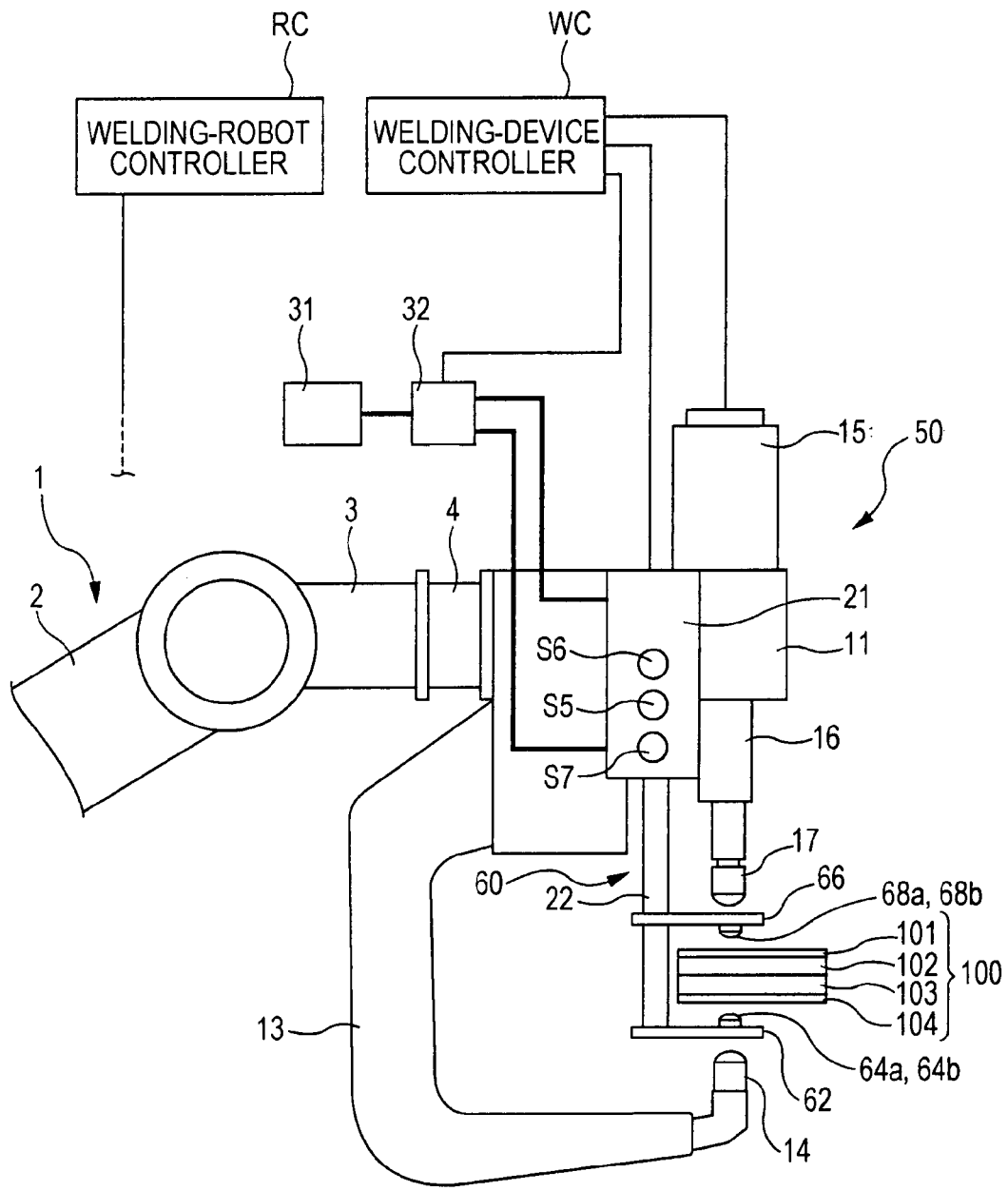
FIG. 12 illustrates the configuration of a spot-welding device according to a third embodiment.
Figure 13:
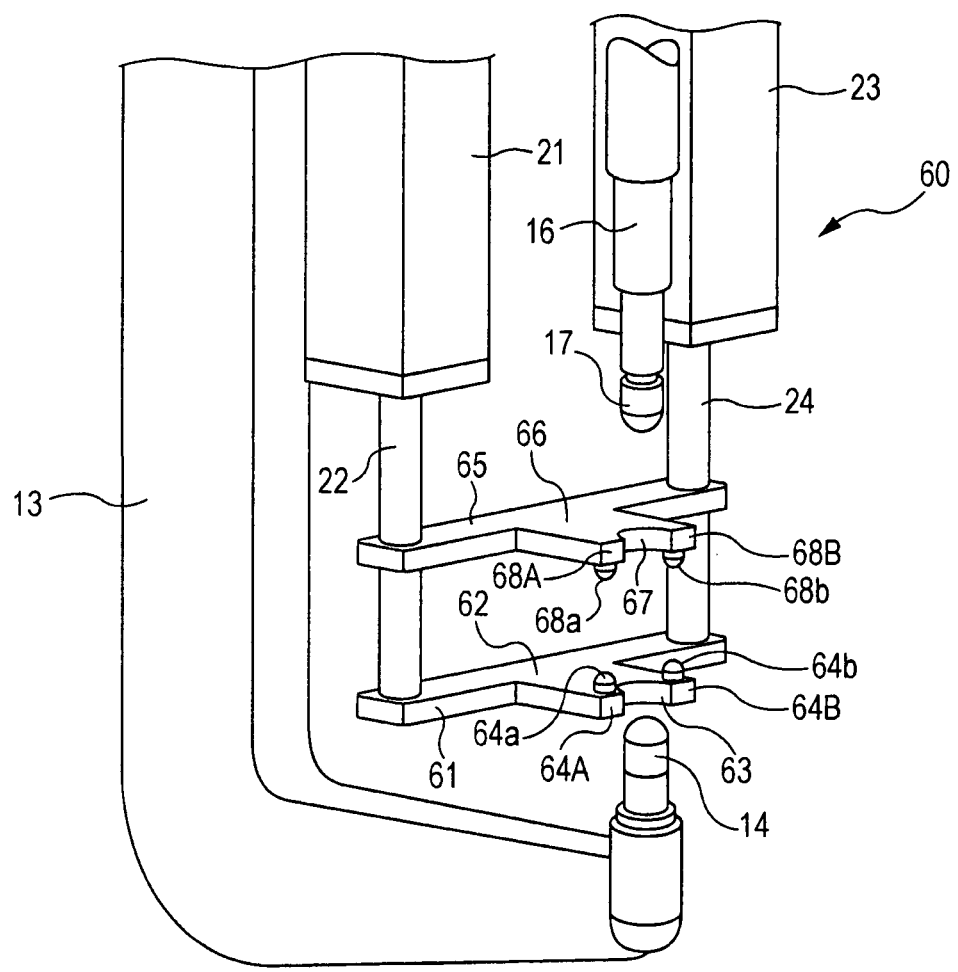
FIG. 13 is an enlarged perspective view of a relevant part of the spot-welding device.

A third embodiment of the present invention will be described below with reference to FIGS. 12 to 17. FIG. 12 illustrates the configuration of a spot-welding device, FIG. 13 illustrates a relevant part of the spot-welding device, and FIGS. 14A to 14H illustrate operation steps thereof. Components in FIGS. 12 to 14H that correspond to those in FIGS. 1 and 2 are given the same reference numerals, and detailed descriptions thereof will be omitted.

In FIG. 12, reference numeral 1 denotes a welding robot, reference numeral 50 denotes a spot-welding device supported by the welding robot 1, and reference numeral 110 denotes a workpiece to be spot-welded.

Before describing the welding robot 1 and the spot-welding device 50, the workpiece 110 will be described first. The workpiece 110 has a four-stacked-plate structure formed by stacking thin plates over opposite faces of two stacked thick plates. For example, the four-stacked-plate structure includes a first thick plate 102 and a second thick plate 103 having high rigidity and stacked one on top of the other, and a first thin plate 101 and a second thin plate 104 having low rigidity and respectively stacked over opposite faces of the first thick plate 102 and the second thick plate 103.

The welding robot 1 is, for example, an articulated robot and has a plurality of arms 2 and a wrist 3 attached to an end of the arms 2. The welding robot 1 is capable of three-dimensionally moving the spot-welding device 50 supported by the wrist 3 via an equalizer unit 4. The welding robot 1 sequentially moves the spot-welding device 50 to each preset spot-welding position, that is, a weld section, of the workpiece 110 held at a predetermined position by a clamper (not shown) so as to spot-weld the workpiece 110.

The spot-welding device 50 includes a base 11 attached to the wrist 3 via the equalizer unit 4. A fixed electrode 14 is attached to a lower end of a C-shaped yoke 13, which is attached to the base 11.

A pressure actuator 15 is attached to an upper end of the base 11. A movable electrode 17 disposed facing the fixed electrode 14 is attached to the tip end of a rod 16. The rod 16 is movable toward and away from the fixed electrode 14 along the axis of the fixed electrode 14 by actuating the pressure actuator 15. Thus, the movable electrode 17 is capable of moving toward and away from the fixed electrode 14 between a retreated position corresponding to an ascended end and a pressing position corresponding to a descended end. Specifically, at the retreated position, the movable electrode 17 is positioned away from the fixed electrode 14 by actuating the pressure actuator 15. At the pressing position, the movable electrode 17 clamps the workpiece 110 together with the fixed electrode 14.

The base 11 is provided with control-pressure applying unit 60 that further applies control pressure to the workpiece 110 clamped and pressed between the fixed electrode 14 and the movable electrode 17.

As shown in FIG. 12 and FIG. 13 illustrating an enlarged perspective view of the relevant part, the control-pressure applying unit 60 includes air cylinders 21 and 23 serving as a pair of control-pressure actuators separated from each other with the rod 16 therebetween and having their base ends attached to opposite sides of the base 11 at the C-shaped yoke 13 side. The air cylinders 21 and 23 selectively supply air from an air supply source 31 to respective expansion air chambers or contraction air chambers via an air-supply switch valve 32 so as to expand or contract cylinder rods 22 and 24, and also maintain the air in the contraction air chambers or the expansion air chambers so as to hold the cylinder rods 22 and 24 at the corresponding position.

A lower first connection plate 61 and an upper second connection plate 65 are bridged between tip ends of the cylinder rods 22 and 24 protruding from the tip ends of the air cylinders 21 and 23. The first connection plate 61 and the second connection plate 65 are disposed facing each other in the vertical direction with a gap therebetween into which the workpiece 110 can be inserted.

The first connection plate 61 is provided with a strip-like first workpiece holder 62 whose base end is connected to a central section of the first connection plate 61, that is, a section of the first connection plate 61 between the tip ends of the cylinder rods 22 and 24, and whose tip end extends away from the C-shaped yoke 13. The tip end of the first workpiece holder 62 is provided with an electrode insertion section 63 into which the movable electrode 17 and the fixed electrode 14 can be inserted. The electrode insertion section 63 is formed by cutting out the end of the first workpiece holder 62 into an arc shape or a recessed shape. Moreover, two regulators 64A and 64B respectively protrude from opposite sides of the electrode insertion section 63. The upper surfaces of the regulators 64A and 64B are respectively provided with convexed regulating surface pieces 64a and 64b serving as control pressers.

Likewise, the second connection plate 65 is provided with a strip-like second workpiece holder 66 whose base end is connected to a central section of the second connection plate 65 and whose tip end extends away from the C-shaped yoke 13. The tip end of the second workpiece holder 66 is provided with an electrode insertion section 67 into which the movable electrode 17 and the fixed electrode 14 can be inserted. The electrode insertion section 67 is formed by cutting out the end of the second workpiece holder 66 into an arc shape or a recessed shape. Moreover, two regulators 68A and 68B respectively protrude from opposite sides of the electrode insertion section 67. The lower surfaces of the regulators 68A and 68B are respectively provided with convexed regulating surface pieces 68a and 68b serving as control pressers.

The air cylinders 21 and 23 include a retreated-position detection sensor S5, a first-pressing-position detection sensor S6, and a second-pressing-position detection sensor S7. Specifically, the retreated-position detection sensor S5 detects a retreated position, which is an expanded position of the cylinder rods 22 and 24 of the air cylinders 21 and 23. At the retreated position, the regulating surface pieces 64a and 64b face the lower surface of the second thin plate 104 of the workpiece 110, which is clamped between the fixed electrode 14 and the movable electrode 17, with a gap therebetween, and the regulating surface pieces 68a and 68b face the upper surface of the first thin plate 101 with a gap therebetween. The first-pressing-position detection sensor S6 detects a first pressing position, which is an expanded position of the air cylinders 21 and 23 in a state where the regulating surface pieces 64a and 64b are in pressure contact from below with the second thin plate 104 of the workpiece 110 clamped between the fixed electrode 14 and the movable electrode 17. The second-pressing-position detection sensor S7 detects a second pressing position, which is an expanded position of the air cylinders 21 and 23 in a state where the regulating surface pieces 68a and 68b are in pressure contact from above with the first thin plate 101 of the workpiece 110 clamped between the fixed electrode 14 and the movable electrode 17.

A welding-robot controller RC stores teaching data for the welding robot 1. The teaching data contains an operation program for sequentially spot-welding the welding spots of the workpiece 100, and spot-welding positions, that is, the positions and orientations of the spot-welding device 10 for when spot-welding the welding spots. A welding-device controller WC contains an operation program for the spot-welding device 50 and performs operation control of the air-supply switch valve 32 on the basis of the detection results of the retreated-position detection sensor S5, the first-pressing-position detection sensor S6, and the second-pressing-position detection sensor S7.

For example, when the air cylinders 21 and 23 expand due to air supplied to the respective expansion air chambers and the retreated-position detection sensor S5 detects that the air cylinders 21 and 23 have reached the retreated position, the air-supply switch valve 32 is switched to the retreated position on the basis of the detection signal. Thus, the supply of air to the expansion air chambers is discontinued, and the air in the expansion air chambers is maintained therein, thereby holding the air cylinders 21 and 23 at the retreated position. When the air-supply switch valve 32 is switched from the retreated position so that the air in the expansion air chambers is discharged therefrom and air is supplied to the contraction air chambers, the air cylinders 21 and 23 contract and reach the first pressing position. As the first-pressing-position detection sensor S6 detects that the air cylinders 21 and 23 have reached the first pressing position, the air-supply switch valve 32 is switched to the first pressing position on the basis of the detection signal. Thus, the supply of air to the contraction air chambers is discontinued, and the air in the contraction air chambers is maintained therein, thereby holding the air cylinders 21 and 23 at the first pressing position. When the air-supply switch valve 32 is switched from the first pressing position so that the air in the contraction air chambers is discharged therefrom and air is supplied to the expansion air chambers, the air cylinders 21 and 23 expand and reach the second pressing position. As the second-pressing-position detection sensor S7 detects that the air cylinders 21 and 23 have reached the second pressing position, the air-supply switch valve 32 is switched to the second pressing position on the basis of the detection signal. Thus, the supply of air to the expansion air chambers is discontinued, and the air in the expansion air chambers is maintained therein, thereby holding the air cylinders 21 and 23 at the second pressing position.

Next, the operation of the spot-welding device 50 will be described with reference to FIGS. 14A to 14H illustrating the operation steps of the spot-welding device 50, and FIGS. 15 and 16.

Figure 14A:
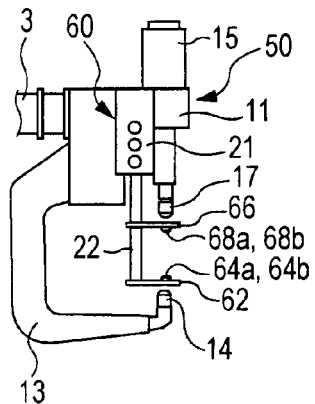
FIGS. 14A to 14H illustrate operation steps of the spot-welding device.
Figure 14B:
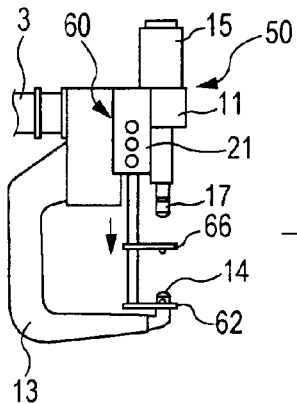

With regard to spot-welding the workpiece 110, when it is confirmed in a first welding step that the movable electrode 17 is at the retreated position located away from the fixed electrode 14 in accordance with a preset operation program and that the retreated-position detection sensor S5 of the control-pressure applying unit 60 has not detected the air cylinders 21 and 23 at the retreated position, as shown in FIG. 14A, the air-supply switch valve 32 is switched in response to an operation signal from the welding-device controller WC so as to start supplying air to the expansion air chambers of the air cylinders 21 and 23, thereby causing the air cylinders 21 and 23 to expand. If the retreated-position detection sensor S5 detects the air cylinders 21 and 23 at the retreated position during the expansion, the supply of air is discontinued at that time. If the air cylinders 21 and 23 are not detected at the retreated position, the air cylinders 21 and 23 expand until the first workpiece holder 62 descends below the tip end of the fixed electrode 14. Then, the supply of air to the contraction air chambers of the air cylinders 21 and 23 is commenced, thereby causing the air cylinders 21 and 23 to contract. As the air cylinders 21 and 23 reach the retreated position during this time, as shown in FIG. 14B, the retreated-position detection sensor S5 detects the air cylinders 21 and 23 at the retreated position. The air-supply switch valve 32 discontinues the supply of air to the contraction air chambers of the air cylinders 21 and 23, and the first workpiece holder 62 and the second workpiece holder 66 are held at the retreated position due to cylinder braking.

Subsequently, when it is confirmed that the air cylinders 21 and 23 are at the retreated position on the basis of the detection signal from the retreated-position detection sensor S5, the welding robot 1 is actuated so as to move the spot-welding device 50 to a spot-welding position of the workpiece 110 in accordance with a preset program. Consequently, a joint section of the workpiece 110 is positioned between the fixed electrode 14 and the movable electrode 17 as well as between the regulating surface pieces 64a and 64b and between the regulating surface pieces 68a and 68b, and the fixed electrode 14 is positioned in contact with a specific position of the second thin plate 104 that corresponds to the spot-welding position, as shown in FIG. 14C.

Figure 14C:
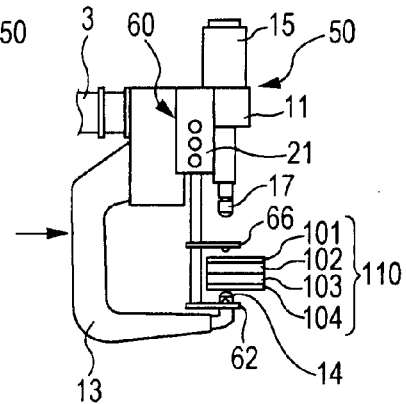

In the state where the spot-welding device 50 is positioned at the welding position, the tip end of the fixed electrode 14 is in contact with the second thin plate 104 of the workpiece 110 from below, whereas the tip end of the movable electrode 17 and the regulating surface pieces 68a and 68b face the first thin plate 101 with a gap therebetween, and the regulating surface pieces 64a and 64b face the second thin plate 104 with a gap therebetween, as shown in FIG. 14C.

Figure 14D:
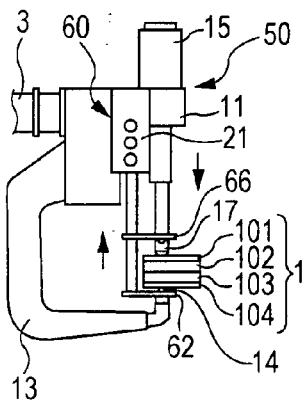

Subsequently, referring to FIG. 14D, the pressure actuator 15 is actuated in the state where the fixed electrode 14 is in contact with the second thin plate 104 of the workpiece 110, so that the movable electrode 17 is moved from the retreated position toward the pressing position, whereby the movable electrode 17 comes into pressure contact with the first thin plate 101. Thus, the pressure of the pressure actuator 15 is applied to the fixed electrode 14 and the movable electrode 17 via the base 11 and the C-shaped yoke 13, whereby the weld section of the workpiece 110 is clamped and pressed between the movable electrode 17 and the fixed electrode 14.

On the other hand, the air-supply switch valve 32 is switched so that the air in the expansion air chambers of the air cylinders 21 and 23 is discharged therefrom and air is supplied to the contraction air chambers. This causes the air cylinders 21 and 23 to contract and the first workpiece holder 62 and the second workpiece holder 66 to ascend, whereby the regulating surface pieces 64a and 64b provided on the upper surface of the first workpiece holder 62 are set adjacent to the tip end of the fixed electrode 14 and come into pressure contact with the second thin plate 104 of the workpiece 110 from below. Moreover, when the contracted air cylinders 21 and 23 reach the first pressing position, the first-pressing-position detection sensor S6 detects the air cylinders 21 and 23. Then, the air-supply switch valve 32 is switched to the first pressing position so that the supply of air to the contraction air chambers of the air cylinders 21 and 23 is discontinued, and the air in the contraction air chambers is maintained therein.

Figure 15:
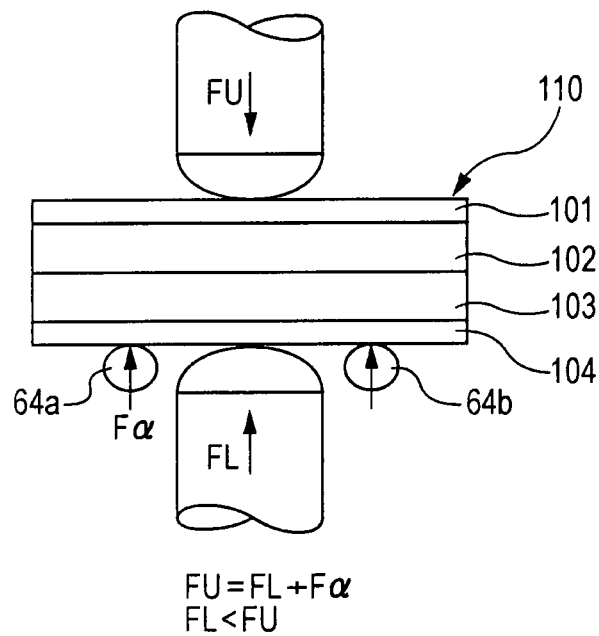
FIG. 15 is an operation diagram thereof.

In this state where the workpiece 110 is clamped and pressed between the fixed electrode 14 and the movable electrode 17, and the regulating surface pieces 64a and 64b apply pressure to the second thin plate 104 due to the air cylinders 21 and 23, a pressure FL from the fixed electrode 14 and a first control pressure Fα from the regulating surface pieces 64a and 64b, set adjacent to the tip end of the fixed electrode 14, due to the air cylinders 21 and 23 are applied to the second thin plate 104 of the workpiece 110 from below, and a pressure FU from the movable electrode 17 is applied to the first thin plate 101, as shown in FIG. 15 which is a schematic operation diagram.

In this case, as schematically shown in FIG. 15, the pressure of the pressure actuator 15 is applied to the movable electrode 17 and to the fixed electrode 14 via the base 11 and the C-shaped yoke 13, and the control pressure of the air cylinders 21 and 23 is applied to the regulating surface pieces 64a and 64b. The sum of the pressure FL applied by the fixed electrode 14 and the first control pressure Fα applied by the regulating surface pieces 64a and 64b to the second thin plate 104 is equal to the pressure FU applied to the first thin plate 101 by the movable electrode 17 (FU=FL+Fα). Consequently, the workpiece 110 is stably clamped by the fixed electrode 14, the movable electrode 17, and the regulating surface pieces 64a and 64b.

On the other hand, in the weld section of the workpiece 110, the pressure FU from the movable electrode 17 is applied to the first thin plate 101, whereas the pressure FL applied to the second thin plate 104 by the fixed electrode 14 is equal to a difference between the pressure FU from the movable electrode 17 and the first control pressure Fα from the regulating surface pieces 64a and 64b (FL=FU−Fα).

Accordingly, the pressure FL from the fixed electrode 14 is set to be smaller than the pressure FU from the movable electrode 17 (FL<FU).

Figure 14E:
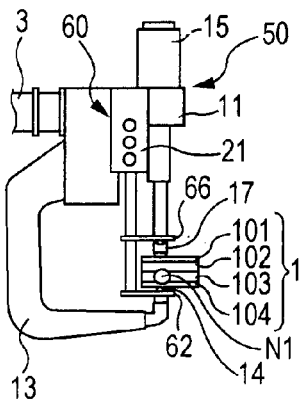

In this state where the workpiece 110 is clamped and pressed between the fixed electrode 14 and the movable electrode 17, and the control pressure from the regulating surface pieces 64a and 64b is applied to the workpiece 110 such that the pressure FL from the fixed electrode 14 located at the second thin plate 104 side is smaller than the pressure FU from the movable electrode 17 located at the first thin plate 101 side, welding is performed by applying electricity between the movable electrode 17 and the fixed electrode 14 for a predetermined time, as shown in FIG. 14E. When the electricity is applied between the movable electrode 17 and the fixed electrode 14 for this welding process, the current density at the joint section between the second thin plate 104 and the second thick plate 103 becomes larger and the calorific value thereof becomes relatively higher than the calorific value at the joint section between the first thin plate 101 and the first thick plate 102. Consequently, a good nugget N1 extending with a large amount of weld penetration from the joint section between the second thin plate 104 and the second thick plate 103 to the joint section between the first thick plate 102 and the second thick plate 103 is formed, thereby ensuring the weld strength of the second thin plate 104 and the second thick plate 103.

Figure 14F:
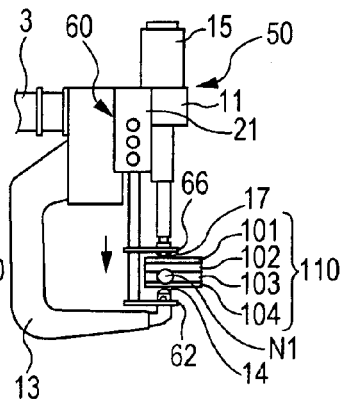

After the welding process is completed, the air-supply switch valve 32 is switched in a second welding step so that the air in the contraction air chambers of the air cylinders 21 and 23 is discharged therefrom and air is supplied to the expansion air chambers, thereby causing the air cylinders 21 and 23 to expand, as shown in FIG. 14F. This causes the first workpiece holder 62 to descend and move away from the second thin plate 104 of the workpiece 110, and the second workpiece holder 66 to descend so that the regulating surface pieces 68a and 68b are set adjacent to the tip end of the movable electrode 17 and come into pressure contact with the first thin plate 101 of the workpiece 110 from above. Moreover, when the expanded air cylinders 21 and 23 reach the second pressing position, the second-pressing-position detection sensor S7 detects the air cylinders 21 and 23. Then, the air-supply switch valve 32 is switched to the second pressing position so that the supply of air to the expansion air chambers of the air cylinders 21 and 23 is discontinued, and the air in the expansion air chambers is maintained therein.

Figure 16:
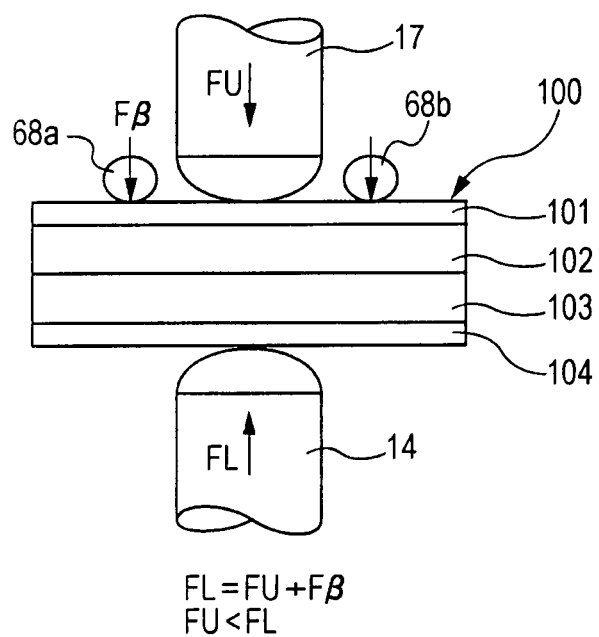
FIG. 16 is another operation diagram thereof.
Figure 17:
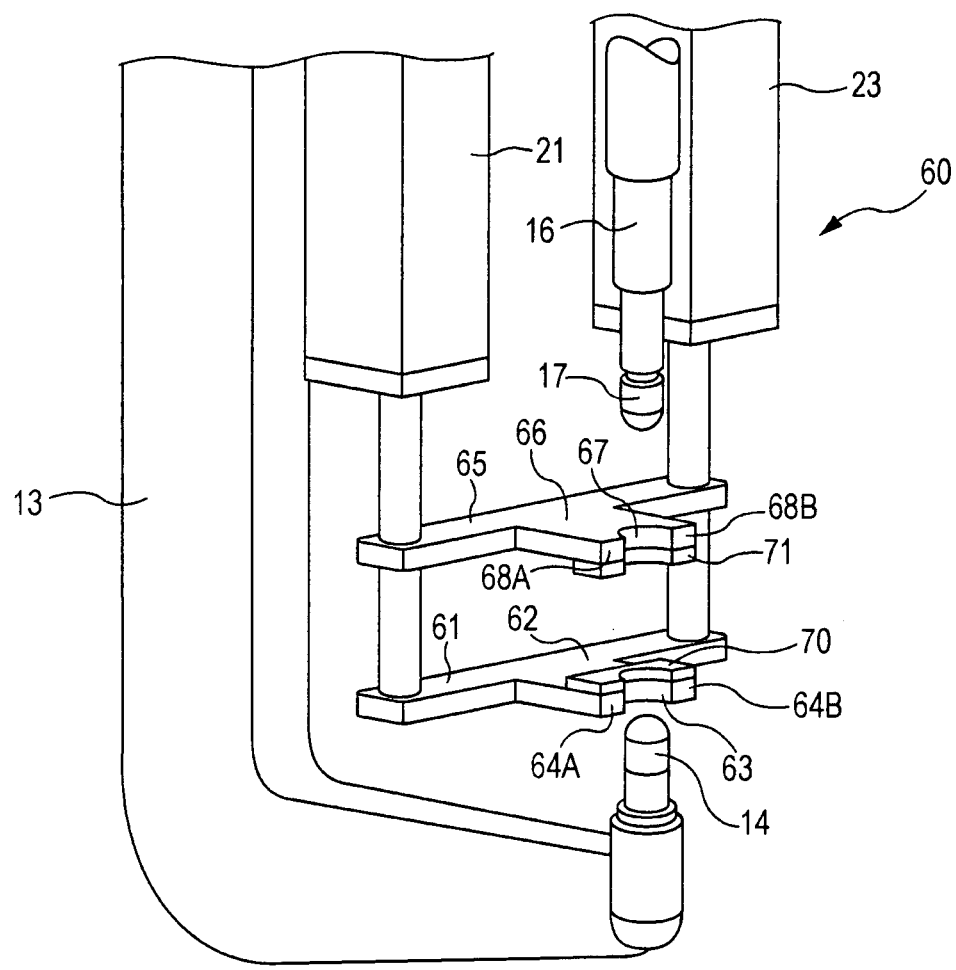
FIG. 17 is an enlarged perspective view of a relevant part of the spot-welding device.
Figure 18A:
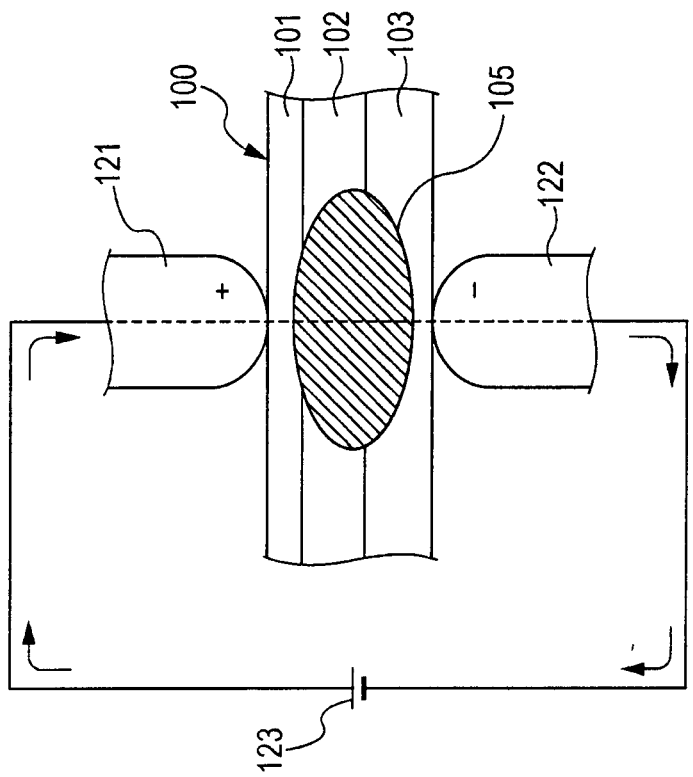
FIGS. 18A and 18B schematically illustrate a spot-welding process in the related art.
Figure 18B:
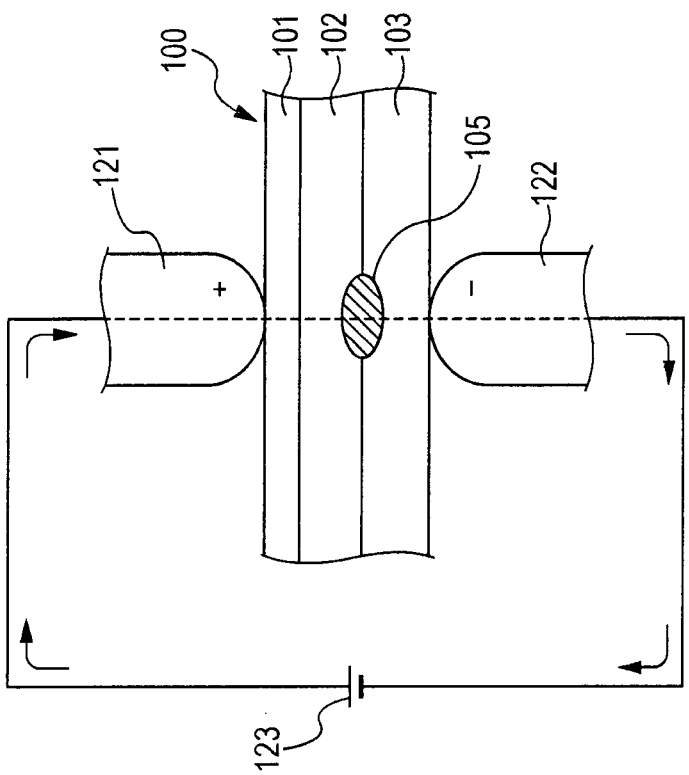
Figure 19:
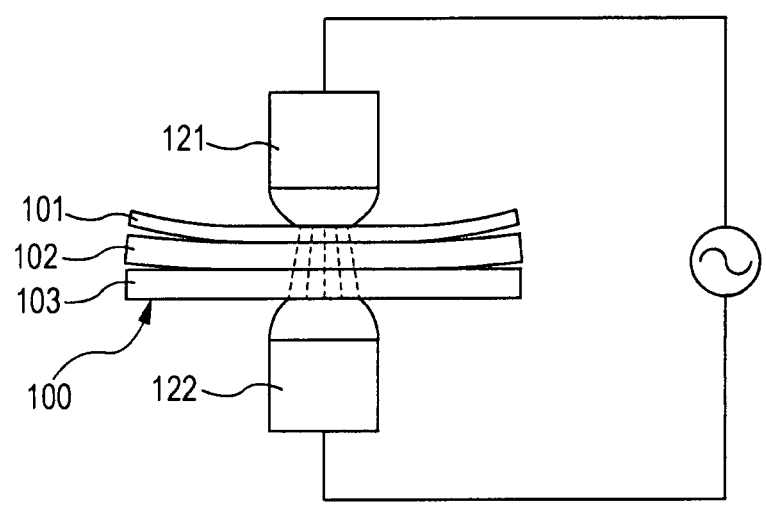
FIG. 19 schematically illustrates the spot-welding process in the related art.
Figure 20:
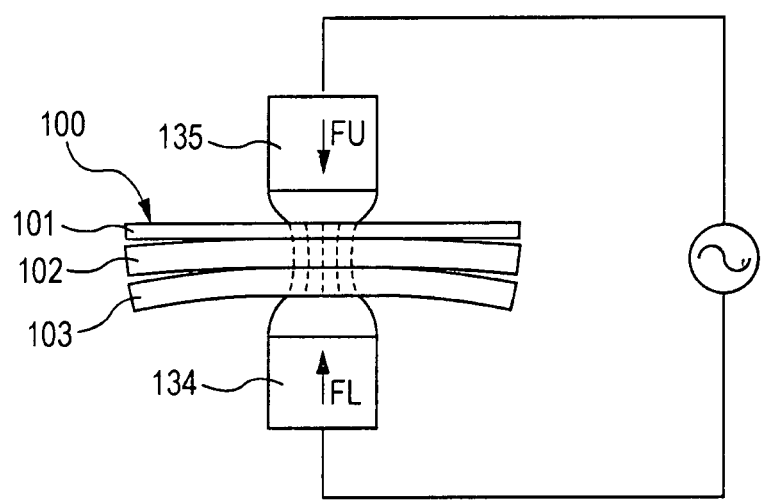
FIG. 20 schematically illustrates another spot-welding process in the related art.
Figure 21:
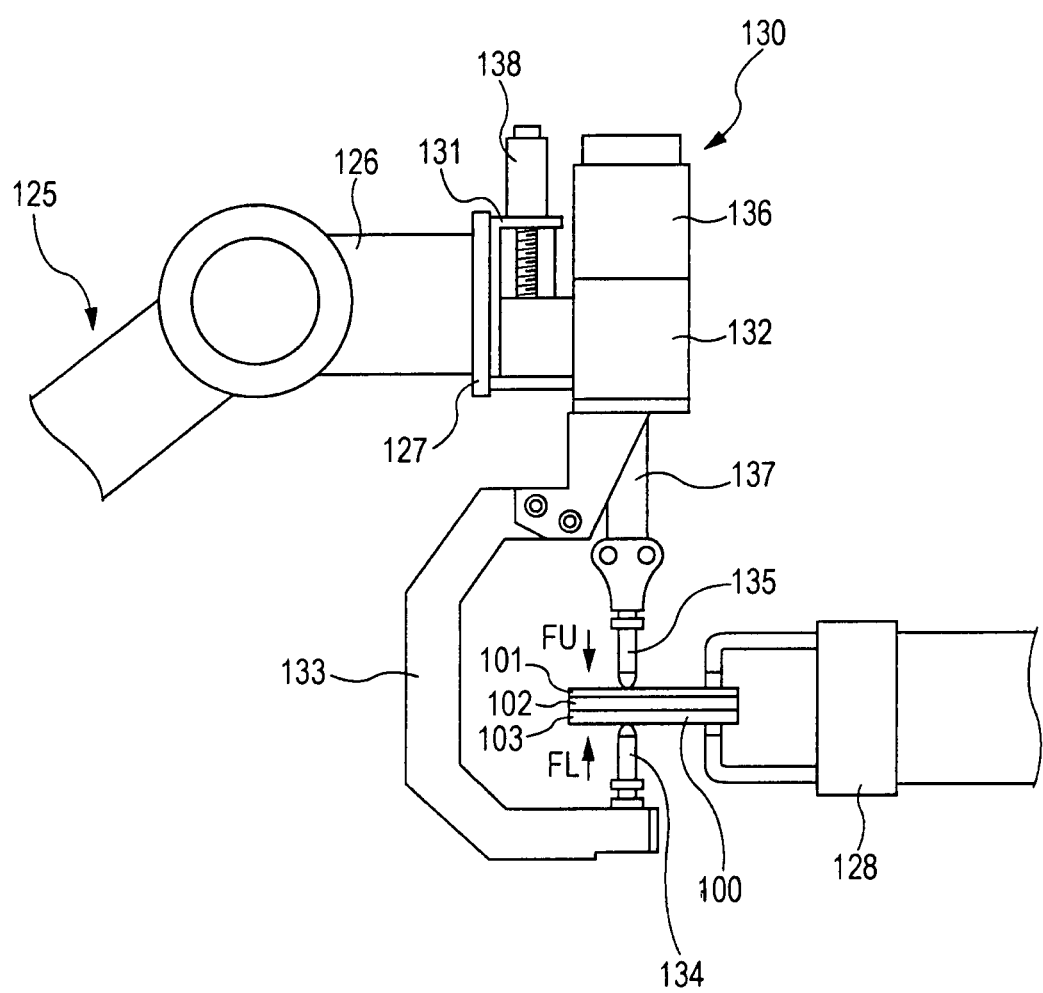
FIG. 21 schematically illustrates the spot-welding process in the related art.

In this state where the workpiece 110 is clamped and pressed between the fixed electrode 14 and the movable electrode 17, and the regulating surface pieces 68a and 68b apply pressure to the first thin plate 101 due to the air cylinders 21 and 23, the pressure FL from the fixed electrode 14 is applied to the second thin plate 104 from below, and the pressure FU from the movable electrode 17 and a second control pressure Fβ from the regulating surface pieces 68a and 68b due to the air cylinders 21 and 23 are applied to the first thin plate 101, as shown in FIG. 16 which is a schematic operation diagram.

In this case, the pressure FL applied to the second thin plate 104 by the fixed electrode 14 is equal to the sum of the pressure FU applied by the movable electrode 17 and the second control pressure Fβ applied by the regulating surface pieces 68a and 68b to the first thin plate 101 (FL=FU+Fβ). Consequently, the workpiece 110 is stably clamped by the fixed electrode 14, the movable electrode 17, and the regulating surface pieces 68a and 68b.

On the other hand, in the weld section of the workpiece 110, the pressure FL from the fixed electrode 14 is applied to the second thin plate 104, whereas the pressure FU applied to the first thin plate 101 by the movable electrode 17 is equal to a difference between the pressure FL from the fixed electrode 14 and the second control pressure Fβ from the regulating surface pieces 68a and 68b (FU=FL−Fβ).

Accordingly, the pressure FU from the movable electrode 17 is set to be smaller than the pressure FL from the fixed electrode 14 (FU<FL).

Figure 14G:
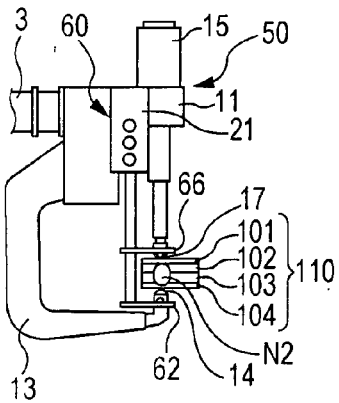

In this state where the workpiece 110 is clamped and pressed between the fixed electrode 14 and the movable electrode 17, and the second control pressure from the regulating surface pieces 68a and 68b is applied to the workpiece 110 such that the pressure FU from the movable electrode 17 located at the first thin plate 101 side is smaller than the pressure FL from the fixed electrode 14 located at the second thin plate 104 side, welding is performed by applying electricity between the movable electrode 17 and the fixed electrode 14 for a predetermined time, as shown in FIG. 14G. When the electricity is applied between the movable electrode 17 and the fixed electrode 14 for this welding process, the current density at the joint section between the first thin plate 101 and the first thick plate 102 becomes relatively higher than the current density at the joint section between the second thin plate 104 and the second thick plate 103. Consequently, a good nugget N2 with a large amount of weld penetration is formed at the joint section between the first thin plate 101 and the first thick plate 102, thereby ensuring the weld strength of the first thin plate 101 and the first thick plate 102.

Specifically, the first welding step involves actively forming the nugget N1 between the second thin plate 104 and the second thick plate 103 by reducing the contact pressure between the second thin plate 104 and the second thick plate 103 and applying electricity between the movable electrode 17 and the fixed electrode 14, thereby ensuring the weld strength. Subsequently, the second welding step involves actively forming the nugget N2 in the contact section between the first thin plate 101 and the first thick plate 102 by reducing the contact pressure between the first thin plate 101 and the first thick plate 102 and applying electricity between the movable electrode 17 and the fixed electrode 14, thereby ensuring the weld strength. Consequently, the weld strength at the weld section of the workpiece 110 having a four-stacked-plate structure including the first thin plate 101, the first thick plate 102, the second thick plate 103, and the second thin plate 104 can be ensured, thereby ensuring the weld quality.

Figure 14H:
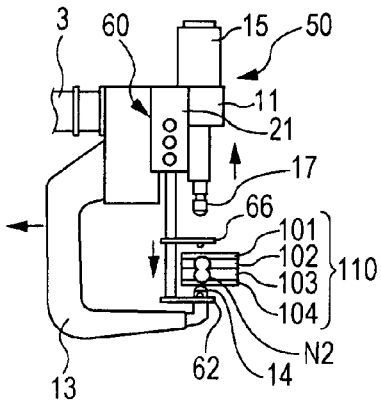

After the welding process is completed, the pressure actuator 15 is actuated so that the movable electrode 17 is moved from the pressing position towards the retreated position, thereby releasing the clamped state of the workpiece 110 between the fixed electrode 14 and the movable electrode 17, as shown in FIG. 14H. On the other hand, the air-supply switch valve 32 is switched so that the air in the expansion air chambers of the air cylinders 21 and 23 is discharged therefrom and air is supplied to the contraction air chambers, thereby causing the air cylinders 21 and 23 to contract. When the contracted air cylinders 21 and 23 reach the retreated position, the retreated-position detection sensor S5 detects the air cylinders 21 and 23. Thus, the air-supply switch valve 32 is switched to the retreated position so that the supply of air to the contraction air chambers of the air cylinders 21 and 23 is discontinued, and the air in the contraction air chambers is maintained therein. Consequently, the first workpiece holder 62 and the second workpiece holder 66 are held at the retreated position.

Subsequently, when it is confirmed that the air cylinders 21 and 23 are at the retreated position on the basis of the detection signal from the retreated-position detection sensor S5, the welding robot 1 is actuated so as to move the spot-welding device 50 away from the spot-welding position of the current workpiece 110 to a spot-welding position of a subsequent workpiece 110.

According to the third embodiment having the above-described configuration, the spot-welding device 50 that spot-welds the workpiece 110 having a four-stacked-plate structure formed by stacking the first thin plate 101 and the second thin plate 104 having low rigidity respectively over opposite faces of the first thick plate 102 and the second thick plate 103 having high rigidity includes the fixed electrode 14 provided at the base 11 via the C-shaped yoke 13, the movable electrode 17 that is provided at the base 11 and that is moved toward and away from the fixed electrode 14 by the pressure actuator 15, and the control-pressure applying unit 60 that selectively applies control pressure to near the welding positions in the first thin plate 101 and the second thin plate 104 of the workpiece 110 clamped and pressed between the fixed electrode 14 and the movable electrode 17. In the workpiece 110 clamped and pressed between the fixed electrode 14 and the movable electrode 17, the pressure FL and the pressure FU are applied to the workpiece 110 from the fixed electrode 14 and the movable electrode 17, respectively, and the first control pressure Fα is applied to near the welding position of the second thin plate 104, so that the contact pressure between the second thin plate 104 and the second thick plate 103 is controlled to be lower than the contact pressure between the first thick plate 102 and the first thin plate 101, whereby the calorific value at the joint section between the second thin plate 104 and the second thick plate 103 becomes relatively higher than the calorific value at the joint section between the first thick plate 102 and the first thin plate 101 when electricity is applied to the movable electrode 17 and the fixed electrode 14. Therefore, the weld strength of the second thin plate 104 and the second thick plate 103 is ensured.

Similarly, the second control pressure Fβ is applied to the first thin plate 101 so that the contact pressure between the first thin plate 101 and the first thick plate 102 becomes lower than the contact pressure between the second thick plate 103 and the second thin plate 104, whereby the current density at the joint section between the first thin plate 101 and the first thick plate 102 becomes relatively higher than the current density at the joint section between the second thick plate 103 and the second thin plate 104 when electricity is applied to the movable electrode 17 and the fixed electrode 14. Therefore, the weld strength of the first thin plate 101 and the first thick plate 102 is ensured, thereby ensuring the weld quality for the workpiece 110 having a four-stacked-plate structure formed by stacking the first thin plate 101 and the second thin plate 104 having low rigidity respectively, over opposite faces of the first thick plate 102 and the second thick plate 103 having high rigidity. In particular, since the workpiece 110 clamped and pressed between the fixed electrode 14 and the movable electrode 17 can receive the pressure FL from the fixed electrode 14, the pressure FU from the movable electrode 17, and the control pressure to near the welding position of the workpiece 110, good nuggets extending from the first thin plate 101 to the second thin plate 104 without unevenness can be formed at various welding positions without being affected by a clamping position where the workpiece 110 is clamped, thereby ensuring the weld strength of the first thin plate 101.

The present invention is not limited to this embodiment and permits various modifications without departing from the scope of the invention. For example, although the above embodiment is directed to an example in which the air cylinders 21 and 23 are used as control-pressure actuators, a servomotor or the like may be used as an alternative.

Furthermore, although the convexed regulating surface pieces 64a, 64b, 68a, and 68b serve as an example of control pressers in the above description, various modifications are permissible in accordance with the shape of the workpiece 110. For example, referring to FIG. 17 corresponding to FIG. 13, the control pressers may alternatively be defined by a semi-arc-shaped regulating surface piece 70 and a semi-arc-shaped regulating surface piece 71. Specifically, the semi-arc-shaped regulating surface piece 70 protrudes upward along the electrode insertion section 63 from the upper surface of the regulators 64A and 64B that are formed along the electrode insertion section 63, which is formed by cutting out the end of the first workpiece holder 62 into an arc shape or a recessed shape. The semi-arc-shaped regulating surface piece 71 protrudes downward along the electrode insertion section 67 from the lower surface of the regulators 68A and 68B that are formed along the electrode insertion section 67, which is formed by cutting out the end of the second workpiece holder 66 into an arc shape or a recessed shape.

Furthermore, in the first embodiment and the second embodiment, a pressing position where the desired control pressure Fα or Fβ can be obtained is preliminarily calculated on the basis of the thickness of the workpiece and the pressures FL and FU, and the air cylinders are controlled such that the regulating surface pieces are positioned at the calculated pressing position. Alternatively, the amount and the pressure of air to be supplied to the corresponding air chambers of the air cylinders may be controlled as parameters or the pressure between the regulating surface pieces and the thin plate may be controlled while directly detecting the pressure, so long as the desired control pressure Fα or Fβ can be obtained from the regulating surface pieces serving as control pressers by using the control-pressure applying unit.

What is claimed is:

1. A spot-welding device for spot-welding a workpiece that includes a thin plate, a first thick plate, and a second thick plate that are sequentially stacked, the first thick plate and the second thick plate being thicker than the thin plate, the spot-welding device comprising:
    a base;
    a first welding electrode configured to face the second thick plate;
    a second welding electrode that is coaxially aligned with the first welding electrode and configured to face the thin plate of the workpiece so as to clamp and press the workpiece together with the first welding electrode;
    a control-pressure applying unit including:
        a first control presser that is set adjacent to the first welding electrode and configured to apply a first control pressure to the second thick plate; and
        a second control presser that is set adjacent to the second welding electrode and configured to apply a second control pressure to the thin plate;
    a control-pressure actuator that is attached to the base, the control-pressure actuator being capable of moving the first control presser and the second control presser selectively between a first pressing position and a second pressing position, the first pressing position being where the second control presser is located away from the thin plate and where the first control presser is set adjacent to the first welding electrode and is brought into contact with the second thick plate so as to apply the first control pressure to the second thick plate, the second pressing position being where the first control presser is located away from the second thick plate and where the second control presser is set adjacent to the second welding electrode and is brought into contact with the thin plate so as to apply the second control pressure to the thin plate; and
    a pressure actuator that is attached to the base and supports the second welding electrode via a rod, the pressure actuator being capable of moving the second welding electrode between a retreated position located away from the workpiece and a pressing position where the second welding electrode is brought into contact with the thin plate so as to clamp the workpiece together with the first welding electrode and to apply pressure onto the workpiece,
    wherein the workpiece is clamped and pressed by the first welding electrode and the first control presser that are brought into contact with the second thick plate, and by the second welding electrode that faces the first welding electrode is brought into contact with the thin plate,
    wherein the workpiece is spot-welded by applying electricity between the second welding electrode and the first welding electrode in the state where the workpiece is clamped and pressed,
    wherein the workpiece is clamped and pressed by the first welding electrode that is brought into contact with the second thick plate, the second welding electrode, and the second control presser that face the first welding electrode are brought into contact with the thin plate, and
    wherein the workpiece is spot-welded by applying electricity between the second welding electrode and the first welding electrode in the state where the workpiece is clamped and pressed.

2. The spot-welding device according to claim 1, wherein the control-pressure actuator comprises an air cylinder attached to the base, and
    wherein the first control presser and the second control presser are separated from each other and are provided at a tip end of a cylinder rod of the air cylinder.

3. The spot-welding device according to claim 1, wherein the control-pressure actuator includes:
    a pair of air cylinders attached to the base in a parallel arrangement;
    a first connection plate and a second connection plate that are separated from each other and are bridged between tip ends of cylinder rods of the air cylinders;
    a first workpiece holder that extends toward the first welding electrode and that has a base end connected to the first connection plate and a tip end provided with the first control presser; and
    a second workpiece holder that extends toward the second welding electrode and that has a base end connected to the second connection plate and a tip end provided with the second control presser.

4. A spot-welding device for spot-welding a workpiece, the spot-welding device comprising:
    a first welding electrode configured to face a plate of the workpiece;
    a second welding electrode that is coaxially aligned with the first welding electrode and configured to face an other plate of the workpiece so as to clamp and press the workpiece together with the first welding electrode; and a control-pressure applying unit including:
- a first control presser that is set adjacent to the first welding electrode and configured to apply a first control pressure to the workpiece; and
- a second control presser that is set adjacent to the second welding electrode and configured to apply a second control pressure to the other workpiece;

the control-pressure applying unit further including air cylinders having cylinder rods configured to expand or contract, the air cylinders serving as a pair of control-pressure actuators separated from each other with the welding electrodes there between, and wherein:

a lower first connection plate is bridged between tip ends of the air cylinder rods protruding from the tip ends of the cylinders, an upper second connection plate is bridged between tip ends of the air cylinder rods protruding from the tip ends of the air cylinders, the upper second connection plate being separated from the lower first connection plate, and the lower first connection plate and the upper second connection plate are formed surrounding the welding electrode.

* * * * *